US011969798B2

(12) United States Patent
Burstrom et al.

(10) Patent No.: US 11,969,798 B2
(45) Date of Patent: Apr. 30, 2024

(54) METHOD IN A PRESSING ARRANGEMENT

(71) Applicant: Quintus Technologies AB, Vasteras (SE)

(72) Inventors: Per Burstrom, Vasteras (SE); Emil Holmstrom, Vasteras (SE)

(73) Assignee: Quintus Technologies AB, Vasteras (SE)

( * ) Notice: Subject to any disclaimer, the term of this patent is extended or adjusted under 35 U.S.C. 154(b) by 106 days.

(21) Appl. No.: 17/421,640

(22) PCT Filed: Jan. 25, 2019

(86) PCT No.: PCT/EP2019/051826
§ 371 (c)(1),
(2) Date: Jul. 8, 2021

(87) PCT Pub. No.: WO2020/151832
PCT Pub. Date: Jul. 30, 2020

(65) Prior Publication Data

US 2022/0088676 A1 Mar. 24, 2022

(51) Int. Cl.
*B22F 3/15* (2006.01)
*B30B 11/00* (2006.01)
(Continued)

(52) U.S. Cl.
CPC .............. *B22F 3/15* (2013.01); *B30B 11/002* (2013.01); *B30B 11/005* (2013.01); *B30B 15/26* (2013.01);
(Continued)

(58) Field of Classification Search
CPC .. B22F 3/15; B22F 2003/153; B22F 2203/11; B22F 2203/13; B30B 11/002; B30B 11/005; B30B 15/26; B30B 15/34
See application file for complete search history.

(56) References Cited

U.S. PATENT DOCUMENTS 4,217,087 A 8/1980 Bowles
4,532,984 A 8/1985 Smith, Jr.
(Continued)

FOREIGN PATENT DOCUMENTS

CN 102282010 A 12/2011
CN 102282011 A 12/2011
(Continued)

OTHER PUBLICATIONS

JP-03140792-A english translation (Year: 1991).*
(Continued)

*Primary Examiner* — Ricardo D Morales
(74) *Attorney, Agent, or Firm* — Harness, Dickey & Pierce, P.L.C.

(57) ABSTRACT

A method in a pressing arrangement is disclosed. The pressing arrangement comprises a pressure vessel arranged to hold pressure medium therein during use of the pressing arrangement, the pressure vessel including a treatment region therein, wherein the treatment region is arranged to accommodate at least one article. The pressing arrangement is arranged so that pressure medium can enter and exit the treatment region. The pressing arrangement comprises at least one controllable pressure medium supplying device configured to transport pressure medium during a cooling phase from another region in the pressing arrangement to the treatment region, wherein the temperature of the pressure medium in the other region is lower than the temperature of the pressure medium in the treatment region during at least part of the cooling phase. At least one value indicative of at least one temperature in the pressure vessel is obtained. Based on the at least one value indicative of at least one temperature in the pressure vessel, at least one operational parameter of the at least one controllable pressure medium supplying device is adjusted, whereby the pressure medium
(Continued)

supplying rate of the at least one pressure medium supplying device is adjusted. A pressing arrangement in which the method may be carried out is also disclosed.

20 Claims, 3 Drawing Sheets

(51) Int. Cl.
*B30B 15/26* (2006.01)
*B30B 15/34* (2006.01)

(52) U.S. Cl.
CPC ........ *B30B 15/34* (2013.01); *B22F 2003/153* (2013.01); *B22F 2203/11* (2013.01); *B22F 2203/13* (2013.01)

(56) References Cited

U.S. PATENT DOCUMENTS

| | | | |
|---|---|---|---|
| 5,533,871 | A | 7/1996 | Takenaka et al. |
| 6,514,066 | B1 | 2/2003 | Bergman |
| 2003/0215539 | A1 | 11/2003 | Manabe et al. |
| 2009/0000495 | A1 | 1/2009 | Graf |
| 2011/0283901 | A1 | 11/2011 | Graf |
| 2011/0285062 | A1 | 11/2011 | Graf |
| 2014/0272745 | A1 | 9/2014 | Gardin |

FOREIGN PATENT DOCUMENTS

| | | | | | |
|---|---|---|---|---|---|
| CN | 102 534 798 | A | | 7/2012 | |
| CN | 103249549 | A | | 8/2013 | |
| CN | 107649686 | A | | 2/2018 | |
| FR | 2 672 669 | A1 | | 8/1992 | |
| JP | 03140792 | A | * | 6/1991 | ........... B30B 11/002 |
| JP | H03 233295 | A | | 10/1991 | |
| JP | H05117708 | A | | 5/1993 | |
| JP | H7-189896 | A | | 7/1995 | |
| JP | H07-39515 | Y2 | | 9/1995 | |
| JP | 2007309626 | A | * | 11/2007 | ........... B30B 11/002 |
| KR | 10-2015-0139536 | A | | 12/2015 | |
| RU | 2302924 | C2 | | 7/2007 | |
| RU | 2427449 | C1 | | 8/2011 | |
| WO | WO-97/20652 | A1 | | 6/1997 | |
| WO | WO-03/070402 | A1 | | 8/2003 | |
| WO | WO-12/069090 | A1 | | 5/2012 | |

OTHER PUBLICATIONS

Japanese Office Action dated Jun. 27, 2023 for corresponding Japanese Application No. 2021-541450, and English-language translation thereof.
Chinese Office Action dated Sep. 29, 2022 issued in corresponding Chinese Appln. No. 201980089064.4 (with English translation).
Office Action dated Jan. 31, 2023 issued in related Japanese patent application No. 2021-541450.
International Search Report PCT/ISA/210 and Written Opinion PCT/ISA/237 for International Application No. PCT/EP2019/051826 dated Jan. 25, 2019.
PCT Application PCT/EP2019/051826 dated Jan. 25, 2019.
International Preliminary Report on Patentability dated May 19, 2021.
Written Opinion of the International Preliminary Examining Authority dated Feb. 19, 2021.
Korean Office Action dated Apr. 11, 2023 for corresponding Korean Application No. 10-2021-7021656, and English-language translation thereof.
Russian Office Action dated May 20, 2022 issued in corresponding Russian Application No. 2021124435 (with English translation).
Korean Office Action dated Oct. 18, 2023 for corresponding Korean Application No. 10-2021-7021656, and English-language translation thereof.
Chinese Office Action dated Sep. 26, 2023 for corresponding Chinese Application No. 201980089064.4, and English-language summary thereof.
Japanese Office Action dated Oct. 3, 2023 for corresponding Japanese Application No. 2021-541450, and English-language translation thereof.

* cited by examiner

METHOD IN A PRESSING ARRANGEMENT

CROSS-REFERENCE TO RELATED APPLICATIONS

This application is a national phase under 35 U.S.C. § 371 of PCT International Application No. PCT/EP2019/051826 which has an International filing date of Jan. 25, 2019, the entire contents of each of which are hereby incorporated by reference.

TECHNICAL FIELD

The present invention generally relates to the field of high-pressure technology, in particular pressure treatment. In particular, the present invention relates to a method in a pressing arrangement, for example for controlling a cooling rate in a pressing arrangement, the pressing arrangement being arranged for treatment of at least one article for example by means of hot pressing, such as hot isostatic pressing (HIP). By means of the method, cooling of treated articles in a controlled fashion may be facilitated or enabled.

BACKGROUND

Hot isostatic pressing (HIP) may for example be used for reducing or even eliminating porosity in castings (e.g., turbine blades) in order to substantially increase their service life and strength (e.g., their fatigue strength). HIP may in addition be used in manufacturing of products by means of compressing powder, which products are desired or required to be fully, or substantially fully, dense, and to have pore-free, or substantially pore-free, outer surfaces, etc.

An article to be subjected to pressure treatment by HIP may be positioned in a load compartment or chamber of a thermally insulated pressure vessel. A treatment cycle may comprise loading the article, treating the article, and unloading the article. Several articles may be treated simultaneously. The treatment cycle may be divided into several parts, or phases, such as a pressing phase, a heating phase, and a cooling phase. After loading an article into the pressure vessel, it may then be sealed, followed by introduction of a pressure medium (e.g., comprising an inert gas such as Argon-containing gas) into the pressure vessel and the load compartment thereof. The pressure and temperature of the pressure medium is then increased, such that the article is subjected to an increased pressure and an increased temperature during a selected period of time. The increase in temperature of the pressure medium, which in turn may cause an increase in temperature of the article, is provided by means of a heating element or furnace arranged in a furnace chamber of the pressure vessel. The pressures, temperatures and treatment times may for example depend on the desired or required material properties of the treated article, the particular field of application, and the required quality of the treated article. Pressures in HIP may for example be in the range from 200 bar to 5000 bar, such as from 800 bar to 2000 bar. Temperatures in HIP may for example be in the range from 300° C. to 3000° C., such as from 800° C. to 2000° C.

When the pressure treatment of the article is finished, the article may need to be cooled before being removed, or unloaded, from the pressure vessel. Characteristics of the cooling—for example the rate thereof—of the article may affect the metallurgical properties of the treated article. It is generally desired to be able to cool an article in a homogeneous manner, and also, if possible, to be able to control the cooling rate. Efforts have been made to reduce the period of time required for cooling of an article subjected to HIP. For example, during cooling phase, it may be required or desired to decrease the temperature of the pressure medium (and thereby of the article) rapidly without causing any large temperature variations within the load compartment (e.g., so that the temperature within the load compartment is reduced in a uniform manner) in a controlled manner, and to maintain the temperature at a certain temperature level or within a certain temperature range during a selected period of time with no or only small fluctuations in temperature during the selected period of time. By not having any large temperature variations within the load compartment during cooling of an article, there may be no or only very small temperature variations within different portions of the article during the cooling thereof. Thereby, internal stresses in the treated article may be reduced.

SUMMARY

While efforts have been made to increase the cooling rate in HIP, the inventors have realized that it would be advantageous to be able to control the cooling rate in HIP with a relatively high flexibility so as to be able to adapt the cooling rate to different requirements or situations, which for example may further facilitate reducing or removing temperature variations within different portions of the treated article during the cooling thereof, which may be beneficial in reducing internal stresses in the treated article.

In view of the above, a concern of the present invention is to provide a method in a pressing arrangement such as a pressing arrangement for HIP, which method may be used for controlling a cooling rate in a pressing arrangement such as a pressing arrangement for HIP, and which method may facilitate or allow for controlling the cooling rate in the pressing arrangement with a relatively high flexibility so as to be able to adapt the cooling rate to different requirements or situations.

To address at least one of this concern and other concerns, a method in a pressing arrangement and a pressing arrangement in accordance with the independent claims are provided. Preferred embodiments are defined by the dependent claims.

According to a first aspect there is provided a method in a pressing arrangement. The pressing arrangement comprises a pressure vessel arranged to hold pressure medium during use of the pressing arrangement. The pressure vessel includes a treatment region therein. The treatment region is arranged to accommodate at least one article. The pressing arrangement is configured to subject the at least one article to a treatment cycle, which treatment cycle includes a cooling phase, and arranged so that pressure medium can enter and exit the treatment region. The pressing arrangement comprises at least one controllable pressure medium supplying device configured to transport pressure medium during the cooling phase from another region in the pressing arrangement to the treatment region, wherein the temperature of the pressure medium in the other region is lower than the temperature of the pressure medium in the treatment region during at least part of the cooling phase such that by transport of pressure medium during the cooling phase from the other region to the treatment region, the temperature of the pressure medium in the treatment region decreases. The at least one controllable pressure medium supplying device is controllable at least with respect to pressure medium supplying rate by controlling of at least one operational parameter of the at least one controllable pressure medium supplying device. The method comprises, during the cooling phase, obtaining at least one value indicative of at least one temperature in the pressure vessel. During the cooling phase and based on the at least one value indicative of at least one temperature in the pressure vessel, the at least one operational parameter of the at least one controllable pressure medium supplying device is adjusted, thereby adjusting the pressure medium supplying rate of the at least one pressure medium supplying device.

Thus, the pressure medium supplying rate of the at least one pressure medium supplying device may be adjusted based on the at least one value indicative of at least one temperature in the pressure vessel. Thereby, the degree or extent of cooling of the pressure medium in the treatment region, or the rate of cooling of the pressure medium in the treatment region, may depend on the at least one value indicative of at least one temperature in the pressure vessel. By taking into account the at least one value indicative of at least one temperature in the pressure vessel in the adjustment of the pressure medium supplying rate of the at least one pressure medium supplying device, the degree or extent of cooling of the pressure medium in the treatment region, or the rate of cooling of the pressure medium in the treatment region, may be controlled with a relatively high flexibility so as to be able to adapt the cooling rate to different requirements or situations.

Based on the at least one value indicative of at least one temperature in the pressure vessel, a value of a predefined temperature-related parameter of the pressure vessel may be determined. The predefined temperature-related parameter of the pressure vessel may be a function of the at least one value indicative of at least one temperature in the pressure vessel. A difference between a selected value of the predefined temperature-related parameter of the pressure vessel and the determined value of the predefined temperature-related parameter of the pressure vessel may be determined. Based on the difference between the selected value of the predefined temperature-related parameter of the pressure vessel and the determined value of the predefined temperature-related parameter of the pressure vessel, the at least one operational parameter of the at least one controllable pressure medium supplying device may be adjusted, thereby adjusting the pressure medium supplying rate of the at least one pressure medium supplying device. Possibly, a change in the difference between the selected value of the predefined temperature-related parameter of the pressure vessel and the determined value of the predefined temperature-related parameter of the pressure vessel with respect to time may be determined, e.g., by determination of the difference between a selected value of the predefined temperature-related parameter of the pressure vessel and the determined value of the predefined temperature-related parameter of the pressure vessel at two or more different time instants or during two or more different periods of time. For example, the first or second derivative of the difference between the selected value of the predefined temperature-related parameter of the pressure vessel and the determined value of the predefined temperature-related parameter of the pressure vessel with respect to time may be determined. The at least one operational parameter of the at least one controllable pressure medium supplying device may be adjusted based on change in the difference between the selected value of the predefined temperature-related parameter of the pressure vessel and the determined value of the predefined temperature-related parameter of the pressure vessel with respect to time (e.g., based on the first or second derivative of the difference between the selected value of the predefined temperature-related parameter of the pressure vessel and the determined value of the predefined temperature-related parameter of the pressure vessel with respect to time).

The determination of a value of a predefined temperature-related parameter of the pressure vessel based on the at least one value indicative of at least one temperature in the pressure vessel, the determination of a difference between a selected value of the predefined temperature-related parameter of the pressure vessel and the determined value of the predefined temperature-related parameter of the pressure vessel (or the change in the difference with respect to time), and the adjusting of the at least one operational parameter of the at least one controllable pressure medium supplying device based on the difference between the selected value of the predefined temperature-related parameter of the pressure vessel and the determined value of the predefined temperature-related parameter of the pressure vessel (or the change in the difference with respect to time), may be carried out repeatedly, for example such that the value of the predefined temperature-related parameter of the pressure vessel does not exceed the selected value thereof, e.g., over a period of time. Accordingly, the method may comprise or constitute a control loop mechanism for facilitating or ensuring that the predefined temperature-related parameter of the pressure vessel does not exceed the selected value thereof, e.g., over a period of time.

The treatment region may for example be at least in part defined by a furnace chamber which may be comprised in the pressing arrangement. For example, the treatment region may be comprised or constituted by an interior of a furnace chamber, which may be comprised in the pressing arrangement. The furnace chamber may be arranged within the pressure vessel. The furnace chamber may be at least partly enclosed by a heat insulated casing and arranged so that pressure medium can enter and exit the furnace chamber, wherein, as mentioned, the treatment region may be comprised or constituted by an interior of the furnace chamber.

The above-mentioned other region may for example be defined by a region within the pressure vessel that is different and possibly at a distance from the treatment region. The above-mentioned other region must not necessarily be a region within the pressure vessel, but may be a region in the pressing arrangement outside the pressure vessel, such as, for example a region defined by a pressure medium source that is arranged outside the pressure vessel.

The pressing arrangement may comprise a plurality of pressure medium guiding passages in fluid communication with the furnace chamber and arranged to form an outer cooling loop within the pressure vessel. The at least one controllable pressure medium supplying device may be configured to transport pressure medium during the cooling phase from the outer cooling loop to the furnace chamber (or to the treatment region therein). The above-mentioned other region in the pressing arrangement may comprise at least a part of the outer cooling loop.

The predefined temperature-related parameter of the pressure vessel may for example comprise a temperature in the above-mentioned other region in the pressing arrangement, such as, for example, in the above-mentioned outer cooling loop. For example, predefined temperature-related parameter of the pressure vessel may comprise a temperature in a pressure medium guiding passage arranged to guide the pressure medium having exited the furnace chamber in proximity to an inner surface of walls of the pressure vessel, and possibly a temperature of an inner surface of walls of the pressure vessel. The selected value of the predefined temperature-related parameter could in that case for example be a maximum allowed temperature of an inner surface of walls of the pressure vessel. Thus, the at least one controllable pressure medium supplying device may be controlled, e.g., continuously or continually, for example such that the maximum allowed temperature of an inner surface of walls of the pressure vessel is not exceeded.

The predefined temperature-related parameter of the pressure vessel may comprise several, different temperatures, such as different temperatures in the above-mentioned other region in the pressing arrangement. The temperature(s) may be temperature(s) within the pressure vessel, but this is not required, as also indicated in the foregoing. For example, the predefined temperature-related parameter of the pressure vessel may be at least in part defined by difference between at least two values indicative of temperature in the pressure vessel at different regions or positions therein at the same time instants or within a same period of time. For example, the predefined temperature-related parameter of the pressure vessel may be at least in part defined by a difference between at least two values indicative of temperature at different positions on or in a component (or in several components) in the pressure vessel or the pressing arrangement, such as a temperature gradient between the different positions on or in the component. Thus, the predefined temperature-related parameter of the pressure vessel may for example be at least in part defined by a temperature gradient between different positions on or in a component in the pressure vessel or the pressing arrangement. The component may be fixedly arranged or removably arranged (i.e. arranged so that it can be removed) in the pressure vessel or the pressing arrangement. In alternative or in addition, the component may be a part or portion or be constituted by one or more articles that are to be treated in the pressing arrangement. For example, the different positions on or in the component may comprise a position within the component and a position on an outer surface of the component. The temperature at the different positions on or in the component may be sensed by a temperature sensor, or possibly be several temperature sensors, each of which may be configured to sense temperature at one of the different positions, for example. The selected value of the predefined temperature-related parameter could in that case for example be within a range between 50° C. and 300° C., such as, for example, 100° C. or about 100° C. The selected value of the predefined temperature-related parameter may for example be a temperature within a temperature range that is dependent on the component's material properties.

The method may be for controlling the rate of cooling of the pressure medium in the treatment region. The method may comprise obtaining values indicative of at least one temperature in the treatment region obtained at a plurality of time instants. Based on the obtained values, a rate of cooling of the pressure medium in the treatment region may be determined. A difference between a selected value for the rate of cooling of the pressure medium in the treatment region and the determined rate of cooling may be determined. The at least one operational parameter of the at least one controllable pressure medium supplying device may be adjusted based on the difference, thereby adjusting the pressure medium supplying rate of the at least one pressure medium supplying device so that a difference between the rate of cooling of the pressure medium in the treatment region and the selected value decreases. Possibly, a difference between the rate of cooling of the pressure medium in the treatment region and the selected value may become negligible or even zero, or substantially zero. The obtaining of values indicative of at least one temperature in the treatment region sensed at a plurality of time instants, determination of a rate of cooling of the pressure medium in the treatment region based on the obtained values, determination of a difference between the selected value for the rate of cooling of the pressure medium in the treatment region and the determined rate of cooling and the adjusting of the at least one operational parameter of the at least one controllable pressure medium supplying device based on the difference may be carried out during the cooling phase.

The obtaining of values indicative of at least one temperature in the treatment region sensed at a plurality of time instants, determination of a rate of cooling of the pressure medium in the treatment region based on the obtained values, determination of a difference between the selected value for the rate of cooling of the pressure medium in the treatment region and the determined rate of cooling and the adjusting of the at least one operational parameter of the at least one controllable pressure medium supplying device based on the difference may be carried out repeatedly, for example so as to control the rate of cooling of the pressure medium in the treatment region to keep the rate of cooling of the pressure medium in the treatment region within a selected or predefined rate range or at a selected or predefined rate, e.g., over a period of time. Accordingly, the method may comprise or constitute a control loop mechanism for controlling the rate of cooling of the pressure medium in the treatment region to be within a predefined rate range or at a selected rate. The selected value for the rate of cooling of the pressure medium in the treatment region may be referred to as a setpoint for the rate of cooling of the pressure medium in the treatment region. The predefined rate range may be referred to as a controllable cooling rate range. An upper limit (or upper endpoint) for the controllable cooling rate range may be determined based on a maximum achievable cooling power for the pressure medium in the treatment region (e.g., loss of thermal energy of the pressure medium in the treatment region per time unit), which may depend on the configuration of the pressing arrangement, such as the configuration of the furnace chamber which may define the treatment region. A lower limit (or lower endpoint) for the controllable cooling rate range may be determined by a minimal available cooling power for the pressure medium in the treatment region, which may be determined by a "natural" cooling rate for the pressure medium in the treatment region, i.e. when no active cooling of the pressure medium in the treatment region is carried out, and in particular when the at least one pressure medium supplying device is not operated during the cooling phase. In some circumstances, it may be desired to control the cooling rate in the pressing arrangement so as to momentarily or during some period of time obtain a lower cooling rate than the lower limit for the controllable cooling rate range. In such a case, thermal energy may be controllably introduced in the pressure vessel, for example in the treatment region, during the cooling phase. By controllably introducing thermal energy in the pressure vessel during the cooling phase, the cooling rate may decrease. Such thermal energy may for example be introduced by means of operating a furnace, or heater or heating elements, in the furnace chamber.

By adjusting of the at least one operational parameter of the at least one controllable pressure medium supplying device based on the difference between the selected value for the rate of cooling of the pressure medium in the treatment region and the determined rate of cooling, a selected rate of cooling of the pressure medium in the treatment region over time may be achieved, wherein the temperature of the pressure medium in the treatment region versus time may conform to, or substantially conform to, a selected relationship. For example, a linear, or substantially linear, relationship between the temperature of the pressure medium in the treatment region versus time may be achieved. Thereby, the method according to the first aspect may facilitate or allow for controlling the cooling rate in the pressing arrangement with a relatively high flexibility so as to be able to adapt the cooling rate to different requirements. This may for example further facilitate reducing or removing temperature variations within different portions of the treated article during the cooling thereof, which may be beneficial in reducing internal stresses in the treated article.

At least one value indicative of at least one temperature in the pressure vessel, different from the at least one temperature in the treatment region, may be obtained. The adjusting of the at least one operational parameter of the at least one controllable pressure medium supplying device may further be based on the at least one value indicative of at least one temperature in the pressure vessel different from the at least one temperature in the treatment region.

The treatment cycle may comprise loading the at least one article in the pressing arrangement, treating the at least one article, and unloading the at least one article from the pressing arrangement. The treatment cycle in addition to the cooling phase comprise other parts or phases, such as a pressing phase and/or a heating phase (which possibly may be combined in one phase), which may precede the cooling phase.

The pressing arrangement may be arranged for treatment of the at least one article by means of hot pressing, such as, for example, hot isostatic pressing (HIP). The pressure vessel may comprise a pressure cylinder and an end closure. The heat insulated casing may comprise a heat insulating portion and a housing at least partly enclosing the heat insulating portion. A part of the outer cooling loop may comprise at least one first pressure medium guiding passage, which may be formed between at least portions of the housing and the heat insulating portion, respectively, and which may be arranged to guide the pressure medium after having exited the furnace chamber towards the end closure. Another part of the outer cooling loop may comprise at least one second pressure medium guiding passage arranged to guide the pressure medium having exited the furnace chamber in proximity to an inner surface of walls of the pressure cylinder. The at least one controllable pressure medium supplying device may be configured to transport pressure medium during the cooling phase from the other part of the outer cooling loop to the furnace chamber (or to the treatment region therein). The above-mentioned other region in the pressing arrangement may comprise at least a part of the other part of the outer cooling loop.

The adjusting of the at least one operational parameter of the at least one controllable pressure medium supplying device based on a difference between a selected value for the rate of cooling of the pressure medium in the treatment region and the determined rate may for example comprise calculating a rate of cooling of the pressure medium in the treatment region based on the difference. Based on the calculated rate of cooling, the at least one operational parameter of the at least one controllable pressure medium supplying device may be adjusted.

The at least one pressure medium supplying device may for example comprise at least one compressor. The at least one compressor may be arranged such that pressure medium can be transported during the cooling phase from the other region to the treatment region by means of the at least one compressor.

The at least one pressure medium supplying device may comprise at least one ejector and/or another or other types of flow generator for generating a flow of pressure medium. The at least one ejector and/or another or other types of flow generator may be arranged within the pressure vessel, and may be connected by means of at least one pressure medium guiding passage (for example comprise tubing or piping) with the at least one compressor (or the at least one pressure medium supplying device), which may be arranged outside the pressure vessel. The at least one pressure medium supplying device may comprise at least two ejectors and/or another or other types of flow generators, wherein a first ejector (flow generator) that may be arranged in relation to a second ejector (flow generator) so as to receive the flow generated by the second ejector (flow generator), which may hence be arranged in stages. There may be more than two stages. The first ejector (flow generator) may be aligned with the second ejector (flow generator). At least one ejector (flow generator) may be connected to a propellant gas (or pressure medium) system, or pressure medium source, arranged outside the pressure vessel.

The at least one pressure medium supplying device may comprise at least one pressure medium accumulator, which may be positioned intermediate the at least one compressor and the pressure vessel, and possibly positioned intermediate the at least one compressor and the at least one ejector (and/or another or other types of flow generator). The pressure medium accumulator may be arranged at an intermediate position in a flow path for the pressure medium between the at least one compressor and the pressure vessel, or the at least one ejector, such that at least a portion of any pressure medium that is output by the at least one compressor is conveyed to the pressure vessel or the at least one ejector via the pressure medium accumulator. For example, there may be at least one pressure medium guiding passage between the at least one compressor and the pressure vessel, and the pressure medium accumulator may for example be arranged in, or be a part or portion of, the at least one pressure medium guiding passage. The at least one pressure medium guiding passage may for example comprise tubing or piping. The at least one pressure medium accumulator may comprise at least one internal space or cavity in fluid communication with at least one inlet of the at least one pressure medium accumulator and at least one outlet of the at least one pressure medium accumulator, respectively. The at least one pressure medium accumulator may be configured to continuously or continually accumulate pressure medium received via the at least one inlet within the at least one internal space, wherein accumulated amounts of pressure medium are continuously or continually output from the at least one internal space via the at least one outlet such that the pressure medium accumulator outputs a flow of pressure medium via the at least one inlet to the pressure vessel or the at least one ejector. By way of the at least one pressure medium accumulator being positioned intermediate between the at least one compressor and the pressure vessel or the at least one ejector, it may be facilitated or enabled to achieve a steadier—or more even—flow of pressure medium into the pressure vessel or the at least one ejector, as compared to if the at least one compressor would be directly connected to the pressure vessel or the at least one ejector and pressure medium output by the at least one compressor would be directly fed into the pressure vessel or the at least one ejector without passing the at least one pressure medium accumulator. In the context of the present application, by means of the continuous or continual accumulation of pressure medium received by the at least one pressure medium accumulator in the at least one internal space or cavity of the at least one pressure medium accumulator, it is meant that pressure medium received by the at least one pressure medium accumulator is momentarily stored in the at least one internal space or cavity, for example by means of a bladder, piston and/or (elastic) diaphragm based device of the at least one pressure medium accumulator, and which momentary storing of pressure medium is carried out continuously or continually, for example while increasing amounts of pressure medium output from the at least one compressor are received by the at least one pressure medium accumulator.

The at least one compressor may for example comprise at least one piston compressor. Thus, the at least one pressure medium supplying device may for example comprise at least one piston compressor. The at least one operational parameter of the at least one controllable pressure medium supplying device may for example comprise a time delay between successive piston strokes of the at least one piston compressor. The adjustment of the at least one operational parameter of the at least one controllable pressure medium supplying device based on a difference between a selected value for the rate of cooling of the pressure medium in the treatment region and the determined rate may comprise an adjustment of the time delay between successive piston strokes of the at least one piston compressor based on a difference between a selected value for the rate of cooling of the pressure medium in the treatment region and the determined rate. The controlled time delay between successive piston strokes may in principle be set in a range from zero or substantially zero as a lower limit to any feasible upper limit. By increasing the time delay between successive piston strokes of the at least one piston compressor, a smaller amount of relatively cold pressure medium may be transported to the treatment region. Conversely, by decreasing the time delay between successive piston strokes of the at least one piston compressor, a larger amount of relatively cold pressure medium may be transported to the treatment region. Thus, by adjusting the time delay between successive piston strokes of the at least one piston compressor, the rate of cooling of the pressure medium in the treatment region may be controlled. The adjustment of a time delay between successive piston strokes may hence facilitate achieving a selected rate of cooling of the pressure medium in the treatment region over time, wherein the temperature of the pressure medium in the treatment region versus time may conform to, or substantially conform to, a selected relationship, such as, for example, a linear one.

The obtaining of at least one value indicative of at least one temperature in the pressure vessel and/or the obtaining of values indicative of at least one temperature within the treatment region at a plurality of time instants may comprise sensing at least one temperature within the treatment region at a plurality of time instants. This sensing and any other sensing of temperature in the pressure vessel or possibly elsewhere in the pressing arrangement may for example be done by means of a thermometer, a thermocouple and/or another type of temperature sensor or device suitable for sensing temperature. In alternative, or in addition, the obtaining of at least one value indicative of at least one temperature in the pressure vessel and/or the obtaining of values of at least one temperature within the treatment region at a plurality of time instants may comprise receiving the value(s) from a component or element that for example may be included in the pressing arrangement. As will be described further in the following, the method may for example be implemented in a control and processing unit, in which case the obtaining of at least one value indicative of at least one temperature in the pressure vessel and/or the obtaining of values of at least one temperature within the treatment region at a plurality of time instants may comprise the control and processing unit receiving the value(s) from, e.g., a thermometer, a thermocouple and/or another type of temperature sensor or device suitable for sensing temperature, as described in the foregoing.

Sensing at least one temperature in the pressure vessel and/or at least one temperature within the treatment region at a plurality of time instants may for example be carried out by means of at least one sensor which may be arranged within the pressure vessel or treatment region, respectively. However, in alternative or in addition, the at least one sensor could be arranged not in the treatment region but elsewhere within the pressure vessel. For example in such a case, the at least one sensor could possibly be configured to sense at least one temperature in the vicinity of the treatment region, and based thereon, at least one temperature in the treatment region, possibly at a plurality of time instants, could be derived. For example, the at least one sensor could be configured to sense thermal expansion of a part or portion of the pressing arrangement in the vicinity of the treatment region, and based on the sensed thermal expansion, at least one temperature in the treatment region, possibly at a plurality of time instants, could be derived.

In accordance with one or more embodiments of the present invention, the at least one pressure medium supplying device may comprise at least one piston compressor. The at least one operational parameter may comprise a piston stroke length of the at least one piston compressor. The piston stroke length of the at least one piston compressor may be decreased by a selected fraction of the current piston stroke length, if a difference between the selected value for the rate of cooling of the pressure medium in the treatment region and the determined rate is within a predefined rate range during the cooling phase. The predefined rate range may for example be the controllable cooling rate range described in the foregoing, or a sub-range within the controllable cooling rate range. If the rate of cooling of the pressure medium in the treatment region is within the predefined rate range, a decrease by a selected fraction of the current piston stroke length may achieve smaller drops in temperature of the pressure medium in the treatment region per piston stroke of the at least one piston compressor compared to if the piston stroke length would be unchanged. If the piston stroke length has been decreased, the at least one piston compressor may switch direction of the piston based on a timer instead of, e.g., a piston position limit switch, which may otherwise be employed for that purpose. The decrease in piston stroke length may for example be such that the at least one piston compressor employs quarter, half or three quarters of the full piston stroke length. Decreasing the piston stroke length in this manner may (further) facilitate achieving a selected rate of cooling of the pressure medium in the treatment region over time, wherein the temperature of the pressure medium in the treatment region versus time may conform to, or substantially conform to, a selected relationship, such as, for example, a linear one. Decreasing the piston stroke length in this manner may allow or enable more steady operation conditions of the at least one piston compressor compared to if the piston stroke length would be unchanged, since the time delay between successive piston strokes may be reduced as compared to using a full piston stroke length.

If a difference between the selected value for the rate of cooling of the pressure medium in the treatment region and the determined rate is within a predefined rate range during the cooling phase, the piston stroke length of the at least one piston compressor may be decreased by a selected fraction of the current piston stroke length from a first piston stroke length to a second piston stroke length, wherein the second piston stroke length is smaller than the first piston stroke length.

The at least one operational parameter may, in alternative or in addition, comprises a compressor speed of the at least one piston compressor. For example, for a piston compressor including or being constituted by a variable pump, e.g., a frequency-controlled pump, it is possible to adjust the compressor speed thereof.

In the context of the present application, by a compressor speed of the at least one piston compressor it may be meant a speed of the piston of the at least one piston compressor, i.e. the speed of a reciprocating motion of the piston of the at least one piston compressor, or a duty cycle of a high-pressure stage of the at least one piston compressor multiplied by two (for each high-pressure stroke of a piston compressor there is a low-pressure stroke having the same length of the high-pressure stroke).

The adjusting of the at least one operational parameter of the at least one controllable pressure medium supplying device based on a difference between a selected value for the rate of cooling of the pressure medium in the treatment region and the determined rate may comprise adjusting the compressor speed of the at least one piston compressor based on a difference between a selected value for the rate of cooling of the pressure medium in the treatment region and the determined rate.

As mentioned in the foregoing, the piston stroke length of the at least one piston compressor may be decreased by a selected fraction of the current piston stroke length if a difference between the selected value for the rate of cooling of the pressure medium in the treatment region and the determined rate is within a predefined rate range during the cooling phase. On a condition that the compressor speed of the at least one compressor is within a predefined compressor speed range (e.g., if the compressor speed of the at least one compressor exceeds a predefined compressor speed), the piston stroke length of the at least one piston compressor may be increased back towards or to the first piston stroke length. Thus, subsequently to having decreased the piston stroke length, e.g., in the above-described manner, if the compressor speed of the at least one compressor is within a predefined compressor speed range, the piston stroke length of the at least one piston compressor may be increased again, to the first piston stroke length or to a piston stroke length between the second piston stroke length and the first piston stroke length.

The predefined compressor speed range may for example between, e.g., 40% and 100%, e.g., between 90% or about 90% and 100%, of a 'nominal', or normal, or maximum, compressor speed of the at least one piston compressor.

By increasing the piston stroke length of the at least one piston compressor back towards or to the first piston stroke length on a condition that the compressor speed of the at least one compressor is within a predefined compressor speed range (e.g., if the compressor speed of the at least one compressor exceeds a predefined compressor speed), it may be facilitated to achieve a relatively small difference between the rate of cooling of the pressure medium in the treatment region and the selected value (e.g., the setpoint) for the rate of cooling of the pressure medium in the treatment region. Further, it may also be facilitated to increase the lifetime of the at least one piston compressor and possibly also any device(s) connected thereto, since the at least one piston compressor may not operate at full speed all of the time when in operation.

One or more of adjustment of a time delay between successive piston strokes, adjustment of piston stroke length and adjustment of the compressor speed of the at least one piston compressor as described in the foregoing may be applied in combination, possibly in combination with adjustment of any other operational parameter of the at least one controllable pressure medium supplying device.

The adjustment of the at least one operational parameter of the at least one controllable pressure medium supplying device based on a difference between a selected value for the rate of cooling of the pressure medium in the treatment region and the determined rate may for example be carried out using a proportional-integral (PI) controller. Employing a controller such as a PI controller for carrying out the adjustment of the at least one operational parameter of the at least one controllable pressure medium supplying device based on a difference between a selected value for the rate of cooling of the pressure medium in the treatment region and the determined rate may facilitate achieving a selected rate of cooling of the pressure medium in the treatment region over time, wherein the temperature of the pressure medium in the treatment region versus time may conform to, or substantially conform to, a selected relationship, such as, for example, a linear one. The PI controller may have a gain parameter and an integration time parameter. The values of the gain parameter and the integration time parameter to be used may be determined by tuning of the PI controller in a manner as such known in the art.

Another or other types of controllers than PI controllers may be used. For example, instead of or in addition to using a PI controller, a proportional-integral-derivative (PID) controller may be employed for the adjusting of the at least one operational parameter of the at least one controllable pressure medium supplying device based on a difference between a selected value for the rate of cooling of the pressure medium in the treatment region and the determined rate.

It is to be understood that the use of a controller such as a PI controller or a PID controller is not required, and that the use thereof is optional. For example, the adjustment of the at least one operational parameter of the at least one controllable pressure medium supplying device based on a difference between a selected value for the rate of cooling of the pressure medium in the treatment region and the determined rate may be carried out using another or other types of controllers for example such as known in the art.

According to a second aspect there is provided a pressing arrangement. The pressing arrangement comprises a pressure vessel arranged to hold pressure medium therein during use of the pressing arrangement. The pressure vessel includes a treatment region therein. The treatment region is arranged to accommodate at least one article. The pressing arrangement is configured to subject the at least one article to a treatment cycle including a cooling phase and arranged so that pressure medium can enter and exit the treatment region. The pressing arrangement comprises at least one controllable pressure medium supplying device configured to transport pressure medium during the cooling phase from another region in the pressing arrangement to the treatment region, wherein the temperature of the pressure medium in another region is lower than the temperature of the pressure medium in the treatment region during at least part of a cooling phase such that by transport of pressure medium during the cooling phase from the other region to the treatment region, the temperature of the pressure medium in the treatment region decreases. The at least one controllable pressure medium supplying device is controllable at least with respect to pressure medium supplying rate by controlling of the at least one operational parameter of the at least one controllable pressure medium supplying device. The pressing arrangement comprises at least one sensor, which for example may be arranged within the pressure vessel. The at least one sensor is configured to sense at least one temperature in the pressure vessel at a plurality of time instants. The pressing arrangement comprises at least one control and processing module. The at least one control and processing module is communicatively coupled with the at least sensor. The at least one control and processing module is communicatively coupled with the at least one controllable pressure medium supplying device for controlling operation thereof. The at least one control and processing module is configured to, during the cooling phase, obtain at least one value indicative of at least one temperature in the pressure vessel. The at least one control and processing module is configured to, during the cooling phase, based on the at least one value indicative of at least one temperature in the pressure vessel, adjust the at least one operational parameter of the at least one controllable pressure medium supplying device, thereby adjusting the pressure medium supplying rate of the at least one pressure medium supplying device.

The at least one control and processing module may be configured to, during the cooling phase, based on the at least one value indicative of at least one temperature in the pressure vessel, determine a value of a predefined temperature-related parameter of the pressure vessel. The predefined temperature-related parameter of the pressure vessel may be a function of the at least one value indicative of at least one temperature in the pressure vessel. The at least one control and processing module may be configured to, during the cooling phase, determine a difference between a selected value of the predefined temperature-related parameter of the pressure vessel and the determined value of the predefined temperature-related parameter of the pressure vessel, and, based on the difference between the selected value of the predefined temperature-related parameter of the pressure vessel and the determined value of the predefined temperature-related parameter of the pressure vessel, adjust the at least one operational parameter of the at least one controllable pressure medium supplying device, thereby adjusting the pressure medium supplying rate of the at least one pressure medium supplying device.

The at least one sensor may be configured to sense of at least one temperature in the other region of the pressure vessel, the obtained at least one value indicative of at least one temperature in the pressure vessel comprising at least one value indicative of at least one temperature in the other region of the pressure vessel.

The at least one control and processing module may be configured to, during the cooling phase, obtain values indicative of at least one temperature in the treatment region at a plurality of time instants from the at least one sensor, and, based on the obtained values, determine a rate of cooling of the pressure medium in the treatment region. The at least one control and processing module may be configured to determine a difference between a selected value for the rate of cooling of the pressure medium in the treatment region and the determined rate of cooling, and, based on the difference, adjust the at least one operational parameter of the at least one controllable pressure medium supplying device, thereby adjusting the pressure medium supplying rate of the at least one pressure medium supplying device so that a difference between the rate of cooling of the pressure medium in the treatment region and the selected value decreases.

The at least one control and processing module may be configured to, during the cooling phase, obtain at least one value indicative of at least one temperature in the pressure vessel different from the at least one temperature in the treatment region, and adjust the at least one operational parameter of the at least one controllable pressure medium supplying device further based on the at least one value indicative of at least one temperature in the pressure vessel different from the at least one temperature in the treatment region.

The pressing arrangement may comprise a furnace chamber arranged within the pressure vessel. The furnace chamber may be at least partly enclosed by a heat insulated casing and arranged so that pressure medium can enter and exit the furnace chamber, wherein the treatment region may be comprised or constituted by an interior of the furnace chamber. The pressing arrangement may comprise a plurality of pressure medium guiding passages in fluid communication with the furnace chamber and arranged to form an outer cooling loop within the pressure vessel. The at least one controllable pressure medium supplying device may be configured to transport pressure medium during the cooling phase from the outer cooling loop to the furnace chamber (or to the treatment region therein). The above-mentioned other region in the pressing arrangement may comprise at least a part of the outer cooling loop.

During passage of pressure medium in the outer cooling loop, transfer of heat from the pressure medium may take place to other parts or portions of the pressure vessel which for example may be located in proximity to walls of the pressure vessel or an end closure of the pressure vessel, via which transfer of heat from the pressure medium to the outside of the pressure vessel may take place. Thus, the temperature of the pressure medium in the outer cooling loop may be lower than the temperature of the pressure medium in the treatment region.

As mentioned in the foregoing, the at least one pressure medium supplying device may for example comprise at least one compressor. The at least one compressor may be arranged such that pressure medium can be transported during the cooling phase from the other region to the furnace chamber, or the treatment region, by means of the at least one compressor.

The pressure vessel may comprise a pressure cylinder and an end closure. The heat insulated casing may comprise a heat insulating portion and a housing at least partly enclosing the heat insulating portion. A part of the outer cooling loop may comprise at least one first pressure medium guiding passage, which may be formed between at least portions of the housing and the heat insulating portion, respectively, and which may be arranged to guide the pressure medium after having exited the furnace chamber towards the end closure. Another part of the outer cooling loop may comprise at least one second pressure medium guiding passage arranged to guide the pressure medium having exited the furnace chamber in proximity to an inner surface of walls of the pressure cylinder. The at least one controllable pressure medium supplying device may be configured to transport pressure medium during the cooling phase from the other part of the outer cooling loop to the furnace chamber (or to the treatment region therein). The above-mentioned other region in the pressing arrangement may comprise at least a part of the other part of the outer cooling loop.

By guiding pressure medium in proximity to an inner surface of walls of the pressure cylinder, transfer of heat from the pressure medium to the outside of the pressure vessel (or pressure cylinder) may take place via the walls of the pressure cylinder. Thereby, the temperature of the pressure medium in the outer cooling loop, such as in the other part of the outer cooling loop, may be lower than the temperature of the pressure medium in the treatment region.

To increase the transfer of heat from the pressure medium guided in proximity to an inner surface of walls of the pressure cylinder to the outside of the pressure cylinder, the outer surface of the outer walls of the pressure vessel (or pressure cylinder) may be provided with channels, conduits or tubes, etc., which channels, conduits or tubes for example may be arranged so as to be in connection with the outer surface of the outer wall of the pressure vessel and may be arranged to run parallel to an axial direction of the pressure vessel. A coolant for cooling of the walls of the pressure vessel may be provided in the channels, conduits or tubes, whereby the walls of the pressure vessel may be cooled in order to protect the walls from detrimental heat building up during operation of the pressure vessel. The coolant in the channels, conduits or tubes may for example comprise water, but another or other types of coolants are possible.

As mentioned in the foregoing, the at least one pressure medium supplying device may comprise at least one compressor. The at least one compressor may be arranged such that pressure medium can be transported during the cooling phase from the other region to the treatment region by means of the at least one compressor. The at least one pressure medium supplying device may comprise at least one flow generator in fluid communication with the at least one compressor. The at least one flow generator may be arranged within the pressure vessel. The at least one flow generator may be configured to receive pressure medium from said other region at an upstream side of the at least one flow generator and output a flow of pressure medium at a downstream side of the at least one flow generator.

The at least one flow generator may be configured to receive pressure medium from the at least one compressor at the upstream side of the at least one flow generator, and mix the pressure medium received from the at least one compressor and the pressure medium received from said other region to obtain a pressure medium mixture. The flow of pressure medium output at the downstream side of the at least one flow generator may comprise or be constituted by the pressure medium mixture.

According to a third aspect there is provided a control and processing module for use in conjunction with a pressing arrangement according to the second aspect. The control and processing module is communicatively coupled with the at least sensor of the pressing arrangement. The control and processing module is communicatively coupled with the at least one controllable pressure medium supplying device of the pressing arrangement for controlling operation of the at least one controllable pressure medium supplying device. The control and processing module is configured to obtain values indicative of at least one temperature in the treatment region at a plurality of time instants from the at least one sensor of the pressing arrangement. The control and processing module is configured to obtain at least one value indicative of at least one temperature in the pressure vessel. The control and processing module is configured to, based on the at least one value indicative of at least one temperature in the pressure vessel, adjust the at least one operational parameter of the at least one controllable pressure medium supplying device, thereby adjusting the pressure medium supplying rate of the at least one pressure medium supplying device.

The control and processing module may be configured to, based on the at least one value indicative of at least one temperature in the pressure vessel, determine a value of a predefined temperature-related parameter of the pressure vessel. The predefined temperature-related parameter of the pressure vessel may be a function of the at least one value indicative of at least one temperature in the pressure vessel. The control and processing module may be configured to determine a difference between a selected value of the predefined temperature-related parameter of the pressure vessel and the determined value of the predefined temperature-related parameter of the pressure vessel. The control and processing module may be configured to, based on the difference between the selected value of the predefined temperature-related parameter of the pressure vessel and the determined value of the predefined temperature-related parameter of the pressure vessel, adjust the at least one operational parameter of the at least one controllable pressure medium supplying device, thereby adjusting the pressure medium supplying rate of the at least one pressure medium supplying device.

The control and processing module may be configured to determine a rate of cooling of the pressure medium in the treatment region, based on the obtained values. The control and processing module may be configured to determine a difference between a selected value for the rate of cooling of the pressure medium in the treatment region and the determined rate, and, based on the difference, adjust the at least one operational parameter of the at least one controllable pressure medium supplying device of the pressing arrangement, thereby adjusting the pressure medium supplying rate of the at least one pressure medium supplying device so that a difference between the rate of cooling of the pressure medium in the treatment region and the selected value decreases.

The communicative coupling between the at least one control and processing module and the at least sensor and the at least one controllable pressure medium supplying device, respectively, may be realized or implemented for example by means of any appropriate wired and/or wireless communication means or techniques as known in the art.

According to a fourth aspect there is provided a computer program product. The computer program product is configured to, when executed in a control and processing module according to the third aspect, perform a method according to the first aspect.

According to a fifth aspect there is provided a computer-readable storage medium on which there is stored a computer program product. The computer program product is configured to, when executed in a control and processing module according to the third aspect, perform a method according to the first aspect.

The computer-readable storage medium may for example include a Digital Versatile Disc (DVD) or a floppy disk or any other suitable type of computer-readable means or computer-readable (digital) storage medium, such as, but not limited to, a memory such as, for example, nonvolatile memory, a hard disk drive, a Compact Disc (CD), a Flash memory, magnetic tape, a Universal Serial Bus (USB) memory device, a Zip drive, etc.

The control and processing module may alternatively be referred to as a control and/or processing module, or control and processing circuitry, or control and/or processing circuitry. The control and processing module may for example include or be constituted by any suitable central processing unit (CPU), microcontroller, digital signal processor (DSP), Application Specific Integrated Circuit (ASIC), Field Programmable Gate Array (FPGA), etc., or any combination thereof. The control and processing module may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid state memory or a remotely mounted memory, or any combination thereof.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

The figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are illustrated. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
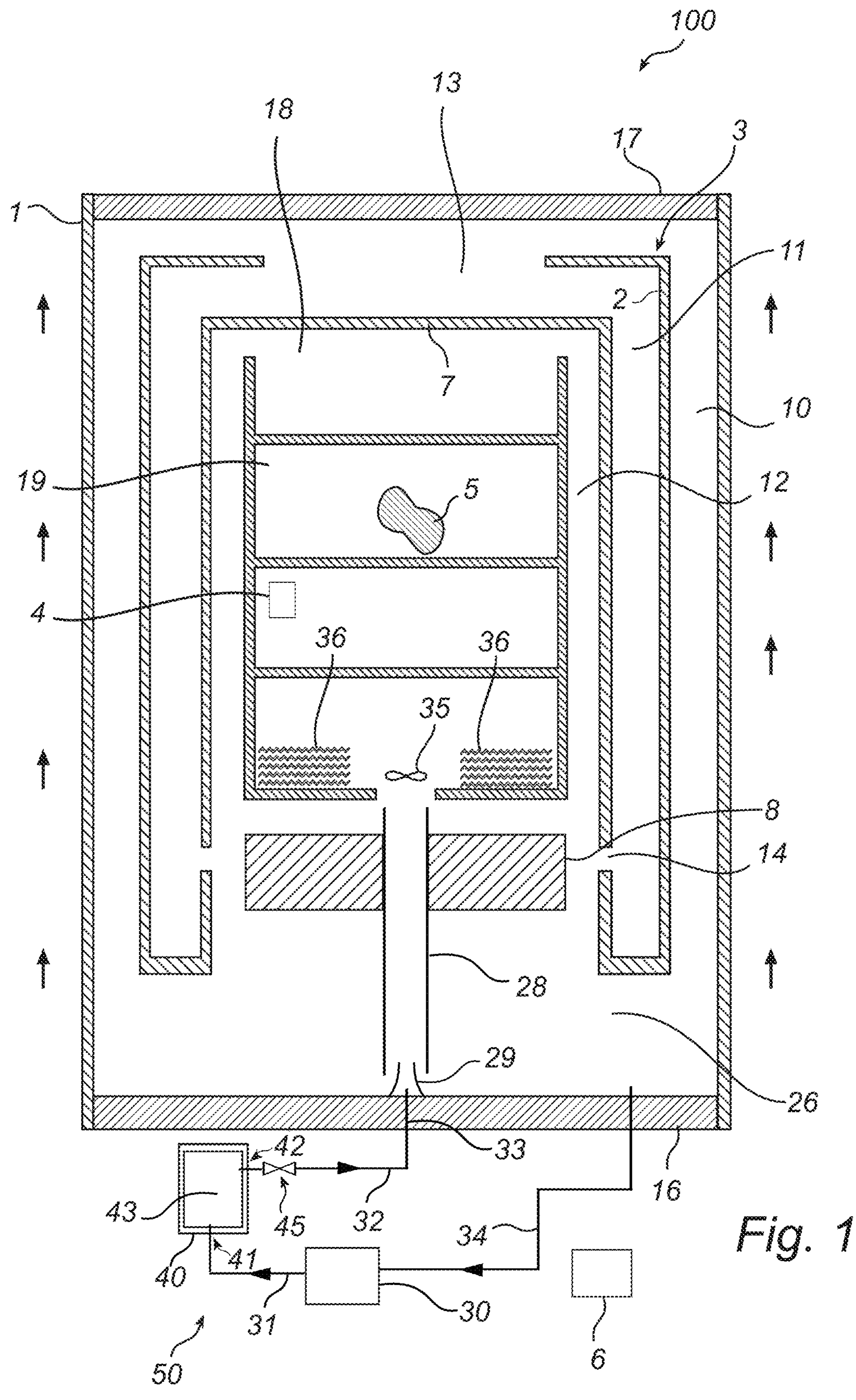
FIG. 1 is a schematic, in part sectional, side view of a pressing arrangement according to an embodiment of the present invention.

FIG. 1 is a schematic, in part sectional, side view of a pressing arrangement 100 according to an embodiment of the present invention. The pressing arrangement 100 is arranged for treatment of at least one article by means of pressing, for example by means of hot pressing such as hot isostatic pressing (HIP).

The pressing arrangement 100 comprises a pressure vessel, which comprises a pressure cylinder 1 and a top end closure 17 and a bottom end closure 16. It is to be understood that the pressure vessel—which will be collectively referred to in the following by way of the reference numerals 1, 16 and 17—may comprise additional parts, components or elements not illustrated in FIG. 1. The pressure vessel 1, 16, 17 is arranged to hold pressure medium therein during use of the pressing arrangement 100.

Per the embodiment of the present invention illustrated in FIG. 1, the pressure vessel 1, 16, 17 comprises a furnace chamber 18. The furnace chamber 18 may comprise a furnace, or heater or heating elements, for heating of the pressure medium in the pressure vessel for example during a pressing phase of a treatment cycle. The furnace is schematically indicated in FIG. 1 by the reference numerals 36. In accordance with the embodiment of the present invention illustrated in FIG. 1, the furnace 36 may be arranged at a lower portion of the furnace chamber 18. In alternative or in addition, the furnace 36 could be arranged in proximity to the inner side, or lateral, surfaces of the furnace chamber 18. It is to be understood that different configurations and arrangements of the furnace 36 in relation to, e.g., within, the furnace chamber 18 are possible. Any implementation of the furnace 36 with regard to arrangement thereof in relation to, e.g., within, the furnace chamber 18 may be used in any one of the embodiments of the present invention described herein. In the context of the present application, the term "furnace" refers to the elements or means for providing heating, while the term "furnace chamber" refers to the area or region in which the furnace and possibly a load compartment and any article are located. As illustrated in FIG. 1, the furnace chamber 18 may not occupy the whole inner space of the pressure vessel 1, 16, 17, but may leave an intermediate space 10 of the interior of the pressure vessel 1, 16, 17 around the furnace chamber 18. The intermediate space 10 forms a pressure medium guiding passage 10. During operation of the pressing arrangement 100, the temperature in the intermediate space 10 may be lower than the temperature in the furnace chamber 18, but the intermediate space 10 and the furnace chamber 18 may be at equal, or substantially equal, pressure.

The pressure vessel 1, 16, 17 includes a treatment region therein. The treatment region may for example be at least in part defined by the furnace chamber 18. For example, the treatment region may be comprised or constituted by an interior of the furnace chamber 18. In the following the treatment region may be referred to by the reference numeral 18, in accordance with the embodiment of the present invention illustrated in FIG. 1, but it is to be understood that in alternative or in addition another treatment region may be employed.

The treatment region 18 is arranged to accommodate at least one article 5. In accordance with the embodiment of the present invention illustrated in FIG. 1, the furnace chamber 18 includes a load compartment 19 which is arranged to accommodate the at least one article 5.

The outer surface of the outer walls of the pressure vessel 1, 16, 17 may be provided with channels, conduits or tubes, etc. (not shown in FIG. 1), which channels, conduits or tubes for example may be arranged so as to be in connection with the outer surface of the outer wall of the pressure vessel 1, 16, 17 and may be arranged to run parallel to an axial direction of the pressure vessel 1, 16, 17. A coolant for cooling of the walls of the pressure vessel 1, 16, 17 may be provided in the channels, conduits or tubes, whereby the walls of the pressure vessel 1, 16, 17 may be cooled in order to protect the walls from detrimental heat building up during operation of the pressure vessel 1, 16, 17. The coolant in the channels, conduits or tubes may for example comprise water, but another or other types of coolants are possible. An exemplifying flow of coolant in channels, conduits or tubes provided on the outer surface of the outer walls of the pressure vessel 1, 16, 17 is indicated in FIG. 1 by the arrows on the outside of the pressure vessel 1, 16, 17.

On the outside surface of the outer walls of the pressure cylinder 1, and possibly on any channels, conduits and/or tubes, etc. for coolant as described it the foregoing, pre-stressing means may be provided. The pre-stressing means (not shown in FIG. 1) may for example be provided in the form of wires (e.g., made of steel) wound in a plurality of turns so as to form one or more bands, and preferably in several layers, around the outside surface of the outer walls of the pressure cylinder 1 and possibly also any channels, conduits and/or tubes, etc. for coolant that may be provided thereon. The pre-stressing means may be arranged for exerting radial compressive forces on the pressure cylinder 1.

Even though it is not explicitly indicated in FIG. 1, the pressure vessel 1, 16, 17 may be arranged such that it can be opened and closed, such that any article within the pressure vessel 1, 16, 17 may be inserted or removed. An arrangement of the pressure vessel 1, 16, 17 such that it can be opened and closed may be realized in a number of different manners, as known in the art. Although not explicitly indicated in FIG. 1, one or both of the top end closure 17 and the bottom end closure 16 may be arranged so that it or they can be opened and closed.

The pressing arrangement 100 is configured to subject the at least one article 5 to a treatment cycle, which treatment cycle includes a cooling phase, and is arranged so that pressure medium can enter and exit the treatment region. In accordance with the embodiment of the present invention illustrated in FIG. 1, the furnace chamber 18 is enclosed by a heat insulated casing 3 and is arranged so that pressure medium can enter and exit the furnace chamber 18.

Further in accordance with the embodiment of the present invention illustrated in FIG. 1, the heat insulated casing 3 comprises a heat insulating portion 7, a housing 2 which is partly enclosing the heat insulating portion 7, and a bottom insulating portion 8. Not all of the elements of the heat insulated casing 3 may be arranged so as to be heat insulated or heat insulating. For example, the housing 2 may not necessarily be arranged so as to be heat insulated or heat insulating. The heat insulated casing 3 surrounding the furnace chamber 18 is likely to save energy during a heating phase of the treatment cycle to which the pressing arrangement 100 may be configured to subject the at least one article 5 to. The heat insulated casing 3 may also facilitate or ensure that convection takes place in a more ordered manner. Because of the vertically elongated shape of the furnace chamber 18 in the illustrated embodiment of the present invention, the heat insulated casing 3 may prevent forming of horizontal temperature gradients, which may be difficult to monitor and control.

The pressure medium used in the pressure vessel 1, 16, 17 or pressing arrangement 100 may for example comprise or be constituted by a liquid or gaseous medium which may have a relatively low chemical affinity in relation to the article(s) to be treated in the pressure vessel 1, 16, 17. The pressure medium may for example comprise a gas, for example an inert gas such as Argon gas.

As indicated in FIG. 1, the pressure medium may exit the load compartment 19 at the top portion thereof and subsequently be guided in a pressure medium guiding passage 12 between the walls of the load compartment 19 and the heat insulating portion 7, after which the pressure medium may enter into a pressure medium guiding passage 11 by way of openings 14 between the heat insulating portion 7 and the housing 2. The openings 14 between the heat insulating portion 7 and the housing 2 may possibly be provided with valves or any other type of adjustable throttle or pressure medium flow restriction means.

The pressure medium that enters into the pressure medium guiding passage 11 by way of the openings 14 between the heat insulating portion 7 and the housing 2 is guided in the pressure medium guiding passage 11 towards the top end closure 17 where it may exit the pressure medium guiding passage 11 and the heat insulated casing 3 by way of an opening 13 in the housing 2, e.g., a central opening 13 in the housing 2, as illustrated in FIG. 1.

A pressure medium guiding passage defined by the space in part defined by the inner surface of the top end closure 17 and the pressure medium guiding passage 10 is arranged to guide the pressure medium having exited the opening 13 in the housing 2 in proximity to the top end closure 17 and in proximity to an inner surface of walls of the pressure vessel 1, 16, 17 (e.g., the walls of the pressure cylinder 1, respectively, as illustrated in FIG. 1) before the pressure medium re-enters into the furnace chamber 18. Thereby, an outer cooling loop may be formed by at least the pressure medium guiding passage 10 and the pressure medium guiding passage 11. In a part of the outer cooling loop, the pressure medium is guided in proximity to the inner surface of the top end closure 17 and the inner surface of walls of the pressure cylinder 1. The amount of thermal energy which may be transferred from the pressure medium during its passage in proximity to inner surfaces of the top end closure 17 and the inner surface of walls of the pressure cylinder 1 may depend on at least one of the following: the speed of the pressure medium, the amount of pressure medium having (direct) contact with the inner surface of the top end closure 17 and the inner surface of walls of the pressure cylinder 1, the relative temperature difference between the pressure medium and the inner surface of the top end closure 17 and the inner surface of walls of the pressure cylinder 1, the thickness of the top end closure 17 and the thickness of the pressure cylinder 1, and the temperature of any flow of coolant in channels, conduits or tubes provided on the outer surface of walls of the pressure cylinder 1 (indicated in FIG. 1 by the arrows on the outside of the pressure cylinder 1).

The pressure medium that is guided in the pressure medium guiding passage 10 back towards the furnace chamber 18 enters a space 26 between the furnace chamber 18—or the bottom insulating portion 8—and the bottom end closure 16. The furnace chamber 18 may be arranged so that pressure medium can enter the furnace chamber 18 from, and exit the furnace chamber 18 into, the space 26. For example, and in accordance with the embodiment of the present invention illustrated in FIG. 1, the furnace chamber 18 may be provided with an opening in the bottom insulating portion 8 permitting pressure medium flow into or out of the furnace chamber 18. As illustrated in FIG. 1, the pressing arrangement 100 may comprise a fan 35 or the like for circulation of pressure medium within the furnace chamber 18. In accordance with the embodiment of the present invention illustrated in FIG. 1, the fan 35 may for example be arranged at an opening in the load compartment 19 above the bottom insulating portion 8 which permits pressure medium flow into or out of the load compartment 19.

As illustrated in FIG. 1, there may be provided a pressure medium conduit 28 (e.g., comprising a transport pipe) which may extend from the space 26 between the bottom insulating portion 8 and the bottom end closure 16, and through the bottom insulating portion 8, so that pressure medium from the pressure medium guiding passage 10 which enters into the space 26 can be guided via the pressure medium conduit 28 into the furnace chamber 18. Possibly, the pressure medium conduit 28 could extend into the load compartment 19, possibly beyond the fan 35, such that the outlet of the pressure medium conduit 28 is located within the load compartment 19. The pressure medium conduit 28 could possibly be provided with one or more openings (not shown in FIG. 1), which possibly may include one or more adjustable throttles such as, for example, valves, permitting flow of pressure medium into the pressure medium conduit 28. Pressure medium which enters into the space 26 between the bottom insulating portion 8 and the bottom end closure 16 after having been guided in the pressure medium guiding passage 10 may be guided towards and into the pressure chamber 18 via the pressure medium conduit 28.

The pressing arrangement 100 comprises a controllable pressure medium supplying device, which is schematically indicated by the element 50 in FIG. 1. The pressure medium supplying device 50 may for example comprise at least one compressor 30, but it is to be understood that in alternative or in addition another or other types of devices for facilitating supplying or conveying a controllable pressure medium than a compressor may be employed. It is to be understood that the pressing arrangement may comprise more than one controllable pressure medium supplying device (e.g., more than one compressor).

The pressure medium supplying device 50 (e.g., the compressor 30) may be configured to output a pressurized flow of pressure medium. The pressure medium supplying device 50 may—in addition or in alternative to a compressor—comprise at least one pressure medium source (e.g., comprising a tank or reservoir of pressure medium).

The pressure medium supplying device 50 may be configured to transport pressure medium during the cooling phase from another region in the pressing arrangement 100 to the treatment region 18, wherein the temperature of the pressure medium in the other region is lower than the temperature of the pressure medium in the treatment region 18 during at least part of the cooling phase, such that by transport of pressure medium during the cooling phase from the other region to the treatment region 18, the temperature of the pressure medium in the treatment region 18 decreases. The pressure medium supplying device 50 may for example, as mentioned above, comprise a compressor 30, which may be arranged such that pressure medium can be transported during the cooling phase from the other region to the treatment region 18 by means of the compressor 30.

The at least one controllable pressure medium supplying device 50 is controllable at least with respect to pressure medium supplying rate by controlling of at least one operational parameter of the at least one controllable pressure medium supplying device 50 or compressor 30. For example, the compressor 30 may comprise a piston compressor (or several piston compressors). Thus, the pressure medium supplying device 50 may for example comprise at least one piston compressor. The at least one operational parameter of the controllable pressure medium supplying device 50 or compressor 30 may for example comprise a time delay between successive piston strokes of the piston compressor. In alternative or in addition, the at least one operational parameter may comprise a compressor speed of the piston compressor. For example, for a piston compressor including or being constituted by a variable pump, e.g., a frequency-controlled pump, it is possible to adjust the compressor speed thereof. It is however to be understood that the at least one operational parameter of the controllable pressure medium supplying device 50 or compressor 30 is not limited to being at least one operational parameter of a piston compressor, which is hence according to an example.

The above-mentioned other region may for example be defined by a region within the pressure vessel 1, 16, 17 that is different and possibly at a distance from the treatment region 18. As mentioned in the foregoing, an outer cooling loop may be formed by at least the pressure medium guiding passage 10 and the pressure medium guiding passage 11. The above-mentioned other region in the pressing arrangement 100 may for example comprise at least a part of the outer cooling loop.

For example, by guiding pressure medium in the pressure medium guiding passage 11 in proximity to an inner surface of walls of the pressure cylinder 1, transfer of heat from the pressure medium to the outside of the pressure vessel 1, 16, 17 (or pressure cylinder 1) may take place via the walls of the pressure cylinder 1. Thereby, the temperature of the pressure medium in the outer cooling loop may be lower than the temperature of the pressure medium in the treatment region 18. To increase the transfer of heat from the pressure medium guided in proximity to an inner surface of walls of the pressure cylinder 1 to the outside of the pressure cylinder 1, the outer surface of the outer walls of the pressure vessel 1, 16, 17 (or pressure cylinder) may, as mentioned above, be provided with channels, conduits or tubes, etc. (not shown in FIG. 1) for coolant, whereby the walls of the pressure vessel 1, 16, 17 may be cooled in order to protect the walls from detrimental heat building up during operation of the pressure vessel 1, 16, 17. The coolant in the channels, conduits or tubes may for example comprise water, but another or other types of coolants are possible.

It is to be understood that the arrangement of the above-mentioned other region as described above is according to an example, and that variations are possible. For example, the above-mentioned other region must not necessarily be a region within the pressure vessel 1, 16, 17, but could, in alternative or in addition, be a region in the pressing arrangement 100 outside the pressure vessel 1, 16, 17, such as, for example a region defined by a pressure medium source (e.g., comprising a tank or reservoir of pressure medium) that may be arranged outside the pressure vessel 1, 16, 17, which pressure medium source may be comprised in, or be connected to, the pressure medium supplying device 50 or the compressor 30.

In accordance with the embodiment of the present invention illustrated in FIG. 1, the controllable pressure medium supplying device 50 further comprises a flow generator 29, which for example may comprise at least one ejector and/or another or other types of flow generator (e.g., one or more fans or pumps or the like), for generating a flow of pressure medium. As illustrated in FIG. 1, the flow generator 29 may be arranged within the pressure vessel 1, 16, 17. In that case, and when the compressor 30 is arranged outside the pressure vessel 1, 16, 17, as illustrated in FIG. 1, the flow generator 29 may be connected to the compressor 30 via one or more pressure medium conduits that may extend through the pressure cylinder 1 or any of the end closures 16, 17 of the pressure vessel 1, 16, 17.

The flow generator 29 is in fluid communication with the compressor 30. The flow generator 29 may be configured to receive pressure medium from the above-mentioned other region at an upstream side of the flow generator 29 and output a flow of pressure medium at a downstream side of the flow generator 29.

In accordance with the embodiment of the present invention illustrated in FIG. 1, there is provided a pressure medium conduit 33 that extends through the end closure 16 of the pressure vessel 1, 16, 17. Further, the pressing arrangement 100 comprises pressure medium guiding passages 31 and 32, wherein the pressure medium guiding passage 32 is in fluid communication with (e.g., connected to) the pressure medium conduit 33. The flow generator 29 is connected to the compressor 30 via the pressure medium guiding passages 31 and 32 and the pressure medium conduit 33. As illustrated in FIG. 1, the pressure medium guiding passages 31 and 32 and the pressure medium conduit 33 may be considered to be comprised in the controllable pressure medium supplying device 50. Any one of the pressure medium guiding passages 31 and 32 and the pressure medium conduit 33 may for example comprise tubing or piping.

Further in accordance with the embodiment of the present invention illustrated in FIG. 1, the controllable pressure medium supplying device 50 additionally, but optionally, comprises a pressure medium accumulator 40, which may be positioned intermediate the compressor 30 and the pressure vessel 1, 16, 17, and possibly positioned intermediate the compressor 30 and the flow generator 29, as illustrated in FIG. 1. The pressure medium guiding passages 31 and 32 are configured to permit passage of pressure medium between the compressor 30 and the pressure medium accumulator 40 and between the pressure medium accumulator 40 and the pressure vessel 1, 16, 17, respectively. Thus, the pressure vessel 1, 16, 17 and the compressor 30 are in fluid communication with each other by means of the pressure medium guiding passages 31 and 32 and the pressure medium accumulator 40. The pressure medium conduit 33 has an inlet in fluid communication with the pressure medium accumulator 40 for receiving the pressure medium flow output from the pressure medium accumulator 40, and an outlet in fluid communication with the flow generator 29 such that the pressure medium flow output from the pressure medium accumulator 40 is input into the flow generator 29. As mentioned in the foregoing, the pressure medium accumulator 40 is optional. The pressure medium guiding passages 31 and 32 and the pressure medium accumulator 40 may be replaced with a pressure medium guiding passage interconnecting the pressure medium conduit 33 and the compressor 30, for example, or the pressure medium conduit 33 may extend to and connect with the compressor 30.

The pressure medium accumulator 40 comprises an inlet 41, which is in fluid communication with the compressor 30 for receiving the flow of pressure medium output by the compressor 30, and an outlet 42, which is in fluid communication with the pressure vessel 1, 16, 17 for outputting a flow of pressure medium to the pressure vessel 1, 16, 17. The pressure medium accumulator 40 could comprise more than one inlet and/or more than one outlet. The pressure medium accumulator 40 may for example comprise at least one tank or reservoir. The pressure medium accumulator 40 comprises an internal space 43, which is in fluid communication with the inlet 41 and with the outlet 42, respectively. The pressure medium accumulator 40 could possibly comprise several internal spaces, which possibly may be interconnected with each other. Each internal space could be in fluid communication with at least one inlet and at least one outlet, respectively, which may correspond to the internal space. Thus, each internal space could have (possibly dedicated) respective inlet(s) and outlet(s) associated therewith. The pressure medium accumulator 40 may be configured to continuously or continually accumulate pressure medium received via the inlet 41 within the internal space 43 of the pressure medium accumulator 40, wherein accumulated amounts of pressure medium may be continuously or continually output from the internal space 43 via the outlet 42 such that the pressure medium accumulator 40 outputs a flow of pressure medium via the inlet 41 to the pressure vessel 1, 16, 17.

In accordance with the embodiment of the present invention illustrated in FIG. 1, the controllable pressure medium supplying device 50 additionally, but optionally, comprises pressure medium flow regulating means 45 for example in the form of one or more valves, as illustrated in FIG. 1, which may be positioned intermediate the pressure medium accumulator 40 and the pressure vessel 1, 16, 17, in the pressure medium guiding passage 32. As further illustrated in FIG. 1, the pressure medium flow regulating means 45 may have an inlet in fluid communication with the pressure medium accumulator 40 and an outlet in fluid communication with the pressure vessel 1, 16, 17. The pressure medium flow regulating means 45 may be configured to control the flow of pressure medium from the pressure medium accumulator 40 to the pressure vessel 1, 16, 17.

The flow generator 29 may be configured to receive pressure medium from the compressor 30 at the upstream side of the flow generator 29, and mix the pressure medium received from the compressor 30 and the pressure medium received from the above-mentioned other region to obtain a pressure medium mixture. The flow of pressure medium output at the downstream side of the flow generator 29 may comprise or be constituted by the pressure medium mixture.

The above-mentioned other region, from which the controllable pressure medium supplying device 50 may transport pressure medium to the treatment region 18 during the cooling phase, may for example be defined at least in part by the space 26 illustrated in FIG. 1, which space 26 may form part of an outer cooling loop.

For example, as mentioned in the foregoing, pressure medium which enters into the space 26 between the bottom insulating portion 8 and the bottom end closure 16 after having been guided in the pressure medium guiding passage 10 may be guided towards and into the furnace chamber, or treatment region, 18 via the pressure medium conduit 28. This transport of pressure medium via the pressure medium conduit 28 may be joined by (e.g., mixed with) the pressure medium flow output from the flow generator 29. Thereby, the controllable pressure medium supplying device 50 may be configured to transport pressure medium during the cooling phase from the space 26, in which the temperature of the pressure medium is relatively cool after having been guided in, e.g., the pressure medium guiding passage 11 in proximity to an inner surface of walls of the pressure cylinder 1, and possibly also from any pressure medium source which for example may be connected to the compressor 30, to the treatment region 18. The flow generator 29 may thereby output or eject a mixture of pressure medium, the mixture comprising pressure medium from the space 26 and pressure medium supplied to the pressure vessel 1, 16, 17 for example from any externally arranged pressure medium source via the pressure medium conduit 33. The pressure medium from the space 26 may be drawn into (an inlet of) the flow generator 29 by means of the pressure medium supplied to the pressure vessel 1, 16, 17 from the externally arranged pressure medium source. The mixture of pressure medium that is output or ejected by the flow generator 29 may be guided towards and into the furnace chamber, or treatment region, 18 via the pressure medium conduit 28.

The above-mentioned externally arranged pressure medium source is not required and may be omitted. In alternative or in addition and according to another example, the flow generator 29 may be configured to receive pressure medium transported from the compressor 30 at the upstream side of the flow generator 29, wherein the compressor 30 may be in fluid communication with the pressure vessel 1, 16, 17 for example via one or more pressure medium conduits 34 between the compressor 30 and the pressure vessel 1, 16, 17, which pressure medium conduit(s) 34 may extend through the pressure vessel 1, 16, 17 (e.g., through the bottom end closure 16, as illustrated in FIG. 1) and which may have an inlet within the space 26 and an outlet connected to the compressor 30, as indicated in FIG. 1. Thereby, the flow generator 29 may, output or eject a mixture of pressure medium, which mixture comprises pressure medium from the space 26, which has been drawn into (an inlet of) the flow generator 29 by means of the pressure medium supplied to the pressure vessel 1, 16, 17 from the compressor 30 via the pressure medium conduit 33, and the pressure medium supplied to the pressure vessel 1, 16, 17 from the compressor 30 via the pressure medium conduit 33.

The pressure medium conduit(s) 34 and/or any of the pressure medium conduit 33 and the pressure medium guiding passages 31 and 32 may comprise tubing or piping, for example.

The pressing arrangement 100 comprises at least one sensor, schematically indicated in FIG. 1 by reference numeral 4, which is configured to sense at least one temperature in the pressure vessel 1, 16, 17 at a plurality of time instants. Although only one sensor 4 is illustrated in FIG. 1, it is to be understood that the pressing arrangement 100 may comprise more than one sensor. Each sensor may be configured to sense at least one temperature in the pressure vessel 1, 16, 17, possibly at different locations therein, and at a plurality of time instants. As illustrated in FIG. 1, the sensor 4 (or one of several sensors that may be arranged in the pressing arrangement 100) may for example be arranged within the treatment region 18, which in accordance with the illustrated embodiment in FIG. 1 is defined by an interior of the furnace chamber 18. The sensor 4 may be configured to sense at least one temperature in the treatment region 18 at a plurality of time instants. It is however to be understood that, in alternative or in addition, the sensor 4 and/or any other sensor that may be provided could be arranged not in the treatment region 18 but instead elsewhere within the pressure vessel 1, 16, 17, for example. For example in such a case, the sensor 4 and/or any other sensor that may be provided could possibly be configured to sense at least one temperature in the vicinity of the treatment region 18, and based thereon derive at least one temperature in the treatment region 18 possibly at a plurality of time instants.

The pressing arrangement 100 comprises at least one control and processing module, schematically indicated in FIG. 1 by reference numeral 6. Although only one control and processing module 6 is illustrated in FIG. 1, it is to be understood that the pressing arrangement 100 may comprise more than one control and processing module. The control and processing module 6 is communicatively coupled with the sensor 4 (or with each or any of several sensors that may be arranged in the pressing arrangement 100). The at least one control and processing module 6 is communicatively coupled with the controllable pressure medium supplying device 50 (e.g., with the compressor 30) for controlling operation thereof. The control and processing module 6 is configured to, during a cooling phase, obtain at least one value indicative of at least one temperature in the pressure vessel 1, 16, 17. The control and processing module 6 is configured to, during the cooling phase, based on the at least one value indicative of at least one temperature in the pressure vessel 1, 16, 17, adjust the at least one operational parameter of the controllable pressure medium supplying device 50, thereby adjusting the pressure medium supplying rate of the pressure medium supplying device 50.

In accordance with the embodiment of the present invention illustrated in FIG. 1, according to which the sensor 4 is arranged in the treatment region 18, the at least one value indicative of at least one temperature in the pressure vessel 1, 16, 17 may be, or be based on, at least one temperature at one or more locations in the treatment region 18.

The communicative coupling between the control and processing module 6 and the sensor 4 and the at least one controllable pressure medium supplying device 50, respectively, may be realized or implemented for example by means of any appropriate wired and/or wireless communication means or techniques as known in the art (not shown in FIG. 1).

The control and processing module 6 may be configured to, during the cooling phase, adjust the at least one operational parameter of the controllable pressure medium supplying device based on a quantity derived from at least the at least one value indicative of at least one temperature in the pressure vessel 1, 16, 17. For example, the control and processing module 6 may be configured to, during the cooling phase, based on the at least one value indicative of at least one temperature in the pressure vessel 1, 16, 17, determine a value of a predefined temperature-related parameter of the pressure vessel, wherein the predefined temperature-related parameter of the pressure vessel 1, 16, 17 is a function of the at least one value indicative of at least one temperature in the pressure vessel 1, 16, 17. The control and processing module 6 may be configured to, during the cooling phase, determine a difference between a selected value of the predefined temperature-related parameter of the pressure vessel 1, 16, 17 and the determined value of the predefined temperature-related parameter of the pressure vessel 1, 16, 17. The control and processing module 6 may be configured to carry out the adjusting of the at least one operational parameter of the controllable pressure medium supplying device 50 based on the difference between the selected value of the predefined temperature-related parameter of the pressure vessel 1, 16, 17 and the determined value of the predefined temperature-related parameter of the pressure vessel 1, 16, 17. By the adjusting of the at least one operational parameter of the controllable pressure medium supplying device 50, the pressure medium supplying rate of the pressure medium supplying device 50 is adjusted.

In alternative, or in addition, the control and processing module 6 may be configured to, during the cooling phase, obtain values indicative of at least one temperature in the treatment region 18 at a plurality of time instants from the sensor 4, and, based on the obtained values, determine a rate of cooling of the pressure medium in the treatment region 18. The control and processing module 6 may be configured to, during the cooling phase, determine a difference between a selected value for the rate of cooling of the pressure medium in the treatment region 18 and the determined rate of cooling, and, based on the difference, adjust the at least one operational parameter of the controllable pressure medium supplying device 50, thereby adjusting the pressure medium supplying rate of the pressure medium supplying device 50 so that a difference between the rate of cooling of the pressure medium in the treatment region 18 and the selected value decreases. The obtaining of values indicative of at least one temperature in the treatment region 18 sensed at a plurality of time instants, the determination of a rate of cooling of the pressure medium in the treatment region 18 based on the obtained values, the determination of a difference between the selected value for the rate of cooling of the pressure medium in the treatment region 18 and the determined rate of cooling, and the adjusting of the at least one operational parameter of the controllable pressure medium supplying device 50 based on the difference may be carried out repeatedly. Thus, the control and processing module 6 may be configured to carry out a control loop mechanism for controlling the rate of cooling of the pressure medium in the treatment region 18 to be within a predefined rate range or at a selected rate.

Figure 2:
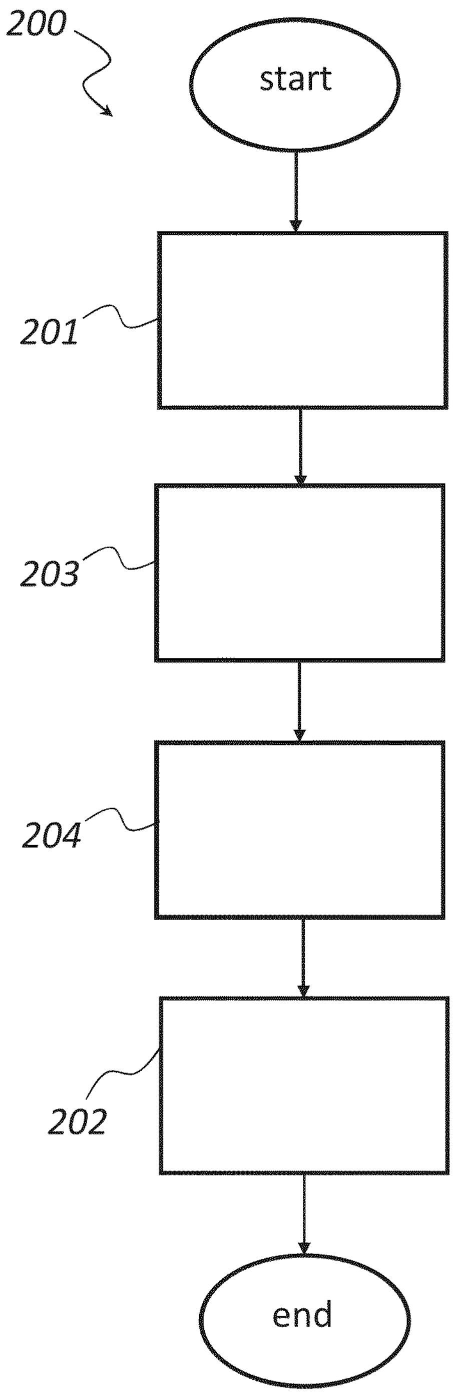
FIGS. 2 and 3 are schematic flowcharts of methods according to embodiments of the present invention.

FIG. 2 is a schematic flowchart of a method 200 according to an embodiment of the present invention. The method 200 is a method in a pressing arrangement, which comprises a pressure vessel arranged to hold pressure medium during use of the pressing arrangement. The pressure vessel includes a treatment region therein. The treatment region is arranged to accommodate at least one article. The pressing arrangement is configured to subject the at least one article to a treatment cycle, which treatment cycle includes a cooling phase, and arranged so that pressure medium can enter and exit the treatment region. The pressing arrangement comprises at least one controllable pressure medium supplying device configured to transport pressure medium during the cooling phase from another region in the pressing arrangement to the treatment region, wherein the temperature of the pressure medium in the other region is lower than the temperature of the pressure medium in the treatment region during at least part of the cooling phase such that by transport of pressure medium during the cooling phase from the other region to the treatment region, the temperature of the pressure medium in the treatment region decreases. The at least one controllable pressure medium supplying device is controllable at least with respect to pressure medium supplying rate by controlling of at least one operational parameter of the at least one controllable pressure medium supplying device.

In accordance with the embodiment of the present invention illustrated in FIG. 2, the method comprises four steps 201, 203, 204, and 202. The step 202 may follow immediately after step 201, and steps 203 and 204 are optional and may be omitted. All of the illustrated steps 201, 202, 203 and 204 may be carried out during the cooling phase.

The method 200 comprises, at 201, obtaining at least one value indicative of at least one temperature in the pressure vessel.

At 202, based on the at least one value indicative of at least one temperature in the pressure vessel, the at least one operational parameter of the at least one controllable pressure medium supplying device may be adjusted, thereby adjusting the pressure medium supplying rate of the at least one pressure medium supplying device.

The at least one value indicative of at least one temperature in the pressure vessel may for example be, or be based on, at least one temperature which may be sensed at one or more locations in the pressure vessel, e.g., in the treatment region.

In accordance with the embodiment of the present invention illustrated in FIG. 2, the adjusting of the at least one operational parameter of the at least one controllable pressure medium supplying device at 202 may be based on a quantity derived from at least the at least one value indicative of at least one temperature in the pressure vessel obtained at 201. The method 200 may optionally comprise, at 203, based on the at least one value indicative of at least one temperature in the pressure vessel, determining a value of a predefined temperature-related parameter of the pressure vessel, wherein the predefined temperature-related parameter of the pressure vessel is a function of the at least one value indicative of at least one temperature in the pressure vessel. The method 200 may optionally further comprise, at 204, determining a difference between a selected value of the predefined temperature-related parameter of the pressure vessel and the determined value of the predefined temperature-related parameter of the pressure vessel. In case the steps 203 and 204 are carried out in the method 200, the adjusting of the at least one operational parameter of the at least one controllable pressure medium supplying device at 202 may comprise adjusting the at least one operational parameter of the at least one controllable pressure medium supplying device based on the difference between the selected value of the predefined temperature-related parameter of the pressure vessel and the determined value of the predefined temperature-related parameter of the pressure vessel. By the adjusting of the at least one operational parameter of the at least one controllable pressure medium supplying device, the pressure medium supplying rate of the at least one pressure medium supplying device is adjusted.

Figure 3:
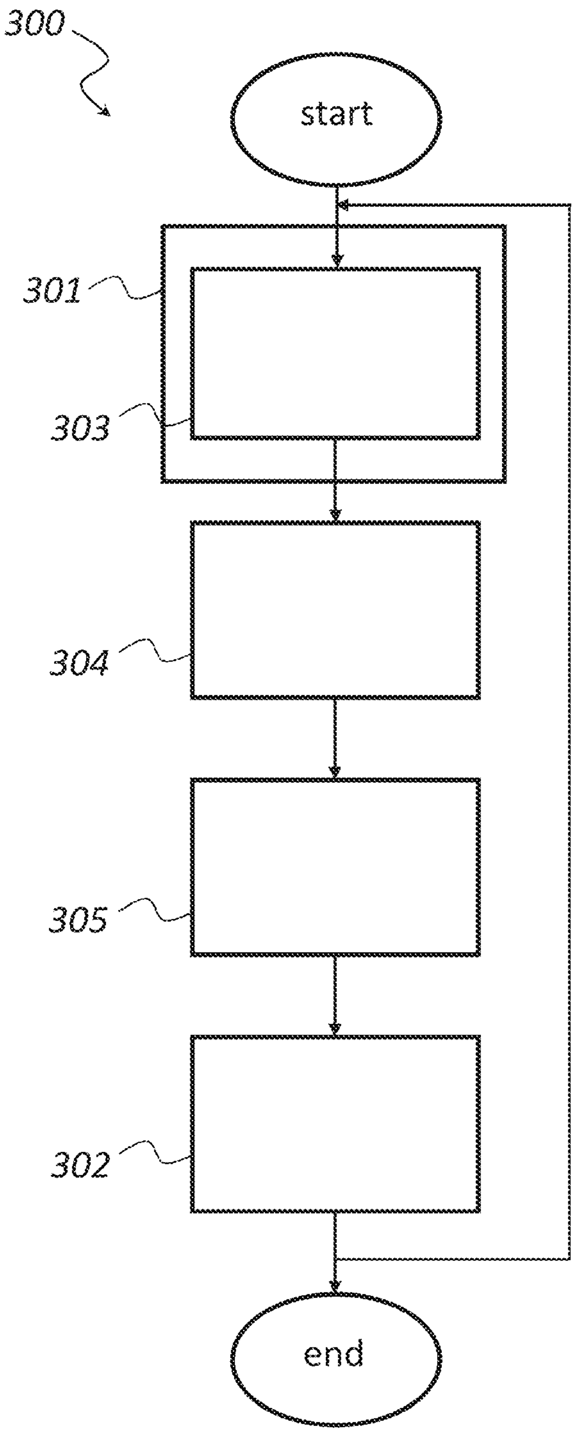

FIG. 3 is a schematic flowchart of a method 300 according to an embodiment of the present invention. Just as the method 200 illustrated in FIG. 2, the method 300 is a method in a pressing arrangement, which comprises a pressure vessel arranged to hold pressure medium during use of the pressing arrangement. The pressure vessel includes a treatment region therein. The treatment region is arranged to accommodate at least one article. The pressing arrangement is configured to subject the at least one article to a treatment cycle, which treatment cycle includes a cooling phase, and arranged so that pressure medium can enter and exit the treatment region. The pressing arrangement comprises at least one controllable pressure medium supplying device configured to transport pressure medium during the cooling phase from another region in the pressing arrangement to the treatment region, wherein the temperature of the pressure medium in the other region is lower than the temperature of the pressure medium in the treatment region during at least part of the cooling phase such that by transport of pressure medium during the cooling phase from the other region to the treatment region, the temperature of the pressure medium in the treatment region decreases. The at least one controllable pressure medium supplying device is controllable at least with respect to pressure medium supplying rate by controlling of at least one operational parameter of the at least one controllable pressure medium supplying device.

The method 300 is for controlling the rate of cooling of the pressure medium in the treatment region. In accordance with the embodiment of the present invention illustrated in FIG. 3, the method comprises four steps 301, 304, 305, and 302. The step 301 may possibly comprise a step 303. The step 302 may follow immediately after step 301, and steps 304 and 305 are optional and may be omitted. Also, the step 303 may be omitted. All of the illustrated steps 301, 302, 303, 204 and 305 may be carried out during the cooling phase.

The method 300 comprises, at 301, obtaining at least one value indicative of at least one temperature in the pressure vessel.

At 302, based on the at least one value indicative of at least one temperature in the pressure vessel, the at least one operational parameter of the at least one controllable pressure medium supplying device is adjusted, thereby adjusting the pressure medium supplying rate of the at least one pressure medium supplying device.

In accordance with the embodiment of the present invention illustrated in FIG. 3, the obtaining of at least one value indicative of at least one temperature in the pressure vessel at 301 comprises, at 303, obtaining values indicative of at least one temperature in the treatment region at a plurality of time instants.

Further in accordance with the embodiment of the present invention illustrated in FIG. 3, the method 300 further comprises, at 304, based on the obtained values, determining a rate of cooling of the pressure medium in the treatment region, and, at 305, determining a difference between a selected value for the rate of cooling of the pressure medium in the treatment region and the determined rate of cooling.

Further in accordance with the embodiment of the present invention illustrated in FIG. 3, the adjusting of the at least one operational parameter of the at least one controllable pressure medium supplying device at 302 comprises, based on the difference obtained at 304, adjusting the at least one operational parameter of the at least one controllable pressure medium supplying device, thereby adjusting the pressure medium supplying rate of the at least one pressure medium supplying device so that a difference between the rate of cooling of the pressure medium in the treatment region and the selected value decreases.

As indicated in FIG. 3 by the arrow extending from the output of step 302 to the input of step 301, the obtaining of values indicative of at least one temperature in the treatment region sensed at a plurality of time instants at 303, the determination of a rate of cooling of the pressure medium in the treatment region based on the obtained values at 304, the determination of a difference between the selected value for the rate of cooling of the pressure medium in the treatment region and the determined rate of cooling at 305, and the adjusting of the at least one operational parameter of the at least one controllable pressure medium supplying device based on the difference at 302 may be carried out repeatedly.

In conclusion, a method in a pressing arrangement is disclosed. The pressing arrangement comprises a pressure vessel arranged to hold pressure medium therein during use of the pressing arrangement, the pressure vessel including a treatment region therein, wherein the treatment region is arranged to accommodate at least one article. The pressing arrangement is arranged so that pressure medium can enter and exit the treatment region. The pressing arrangement comprises at least one controllable pressure medium supplying device configured to transport pressure medium during a cooling phase from another region in the pressing arrangement to the treatment region, wherein the temperature of the pressure medium in the other region is lower than the temperature of the pressure medium in the treatment region during at least part of the cooling phase. At least one value indicative of at least one temperature in the pressure vessel is obtained. Based on the at least one value indicative of at least one temperature in the pressure vessel, at least one operational parameter of the at least one controllable pressure medium supplying device is adjusted, whereby the pressure medium supplying rate of the at least one pressure medium supplying device is adjusted.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word “comprising” does not exclude other elements or steps, and the indefinite article “a” or “an” does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of operating a pressing arrangement, the pressing arrangement including a pressure vessel configured to hold pressure medium therein during use of the pressing arrangement, the pressure vessel including a treatment region therein, wherein the treatment region is configured to accommodate at least one article, wherein the pressing arrangement is configured to subject the at least one article to a treatment cycle including a cooling phase, wherein the pressure vessel is configured to direct the pressure medium to enter and exit the treatment region, the pressing arrangement further including at least one controllable pressure medium supplying device configured to transport the pressure medium during the cooling phase from another region in the pressing arrangement to the treatment region, wherein a temperature of the pressure medium in the other region is lower than a temperature of the pressure medium in the treatment region during at least part of the cooling phase such that the temperature of the pressure medium in the treatment region decreases based on the transport of the pressure medium during the cooling phase from the other region to the treatment region, wherein the at least one controllable pressure medium supplying device is controllable at least with respect to a pressure medium supplying rate, to control a rate of transport of the pressure medium from the other region to the treatment region, based on control of at least one operational parameter of the at least one controllable pressure medium supplying device, the method comprising:

obtaining at least one value indicative of at least one temperature in the pressure vessel during the cooling phase; and based on the at least one value indicative of the at least one temperature in the pressure vessel during the cooling phase, adjusting the at least one operational parameter of the at least one controllable pressure medium supplying device to adjust the pressure medium supplying rate of the at least one controllable pressure medium supplying device to adjust the rate of transport of the pressure medium from the other region to the treatment region during the cooling phase, wherein the at least one controllable pressure medium supplying device comprises at least one compressor, the at least one compressor being configured to cause the pressure medium to be transported during the cooling phase from the other region to the treatment region based on operation of the at least one compressor, wherein the at least one operational parameter of the at least one controllable pressure medium supplying device is at least one operational parameter of the at least one compressor.

2. The method according to claim 1, further comprising:

based on the at least one value indicative of the at least one temperature in the pressure vessel, determining a value of a predefined temperature-related parameter of the pressure vessel, wherein the predefined temperature-related parameter of the pressure vessel is a function of the at least one value indicative of the at least one temperature in the pressure vessel;

determining a difference between a selected value of the predefined temperature-related parameter of the pressure vessel and the determined value of the predefined temperature-related parameter of the pressure vessel; and based on the difference between the selected value of the predefined temperature-related parameter of the pressure vessel and the determined value of the predefined temperature-related parameter of the pressure vessel, adjusting the at least one operational parameter of the at least one controllable pressure medium supplying device to adjust the pressure medium supplying rate of the at least one controllable pressure medium supplying device.

3. The method according to claim 2, wherein the predefined temperature-related parameter of the pressure vessel is at least in part defined by a difference between at least two values indicative of temperature in the pressure vessel at different regions or positions therein at a same time instant or within a same period of time.

4. The method according to claim 2, wherein the predefined temperature-related parameter of the pressure vessel is at least in part defined by a temperature gradient between different positions on or in a component that is in the pressure vessel or outside the pressure vessel in the pressing arrangement.

5. The method according to claim 1, further comprising:

obtaining values indicative of at least one temperature in the treatment region at a plurality of time instants during the cooling phase;

based on the obtained values, determining a rate of cooling of the pressure medium in the treatment region during the cooling phase;

determining a difference between a selected value for the rate of cooling of the pressure medium in the treatment region during the cooling phase and the determined rate of cooling during the cooling phase; and based on the difference, adjusting the at least one operational parameter of the at least one controllable pressure medium supplying device to control the rate of cooling of the pressure medium in the treatment region based on adjusting the pressure medium supplying rate of the at least one controllable pressure medium supplying device so that a difference between the rate of cooling of the pressure medium in the treatment region and the selected value decreases during the cooling phase.

6. The method according to claim 5, further comprising:

obtaining at least one value indicative of at least one temperature in the pressure vessel that is different from the at least one temperature in the treatment region;

wherein the adjusting of the at least one operational parameter of the at least one controllable pressure medium supplying device is further based on the at least one value indicative of the at least one temperature in the pressure vessel that is different from the at least one temperature in the treatment region.

7. The method according to claim 5, wherein the obtaining of values indicative of the at least one temperature in the treatment region at the plurality of time instants during the cooling phase, the determination of the rate of cooling of the pressure medium in the treatment region during the cooling phase based on the obtained values, the determination of the difference between the selected value for the rate of cooling of the pressure medium in the treatment region during the cooling phase and the determined rate of cooling during the cooling phase, and the adjusting of the at least one operational parameter of the at least one controllable pressure medium supplying device based on the difference are performed repeatedly.

8. The method according to claim 5, wherein the adjusting of the at least one operational parameter of the at least one controllable pressure medium supplying device based on the difference between the selected value for the rate of cooling of the pressure medium in the treatment region during the cooling phase and the determined rate of cooling during the cooling phase comprises:

calculating a rate of cooling of the pressure medium in the treatment region during the cooling phase based on the difference; and adjusting the at least one operational parameter of the at least one controllable pressure medium supplying device during the cooling phase based on the calculated rate of cooling.

9. The method according to claim 5, wherein the at least one controllable pressure medium supplying device comprises at least one piston compressor, and the at least one operational parameter comprises a time delay between successive piston strokes of the at least one piston compressor, the adjusting of the at least one operational parameter of the at least one controllable pressure medium supplying device based on the difference between the selected value for the rate of cooling of the pressure medium in the treatment region during the cooling phase and the determined rate of cooling during the cooling phase comprises:

adjusting the time delay between successive piston strokes of the at least one piston compressor based on the difference between the selected value for the rate of cooling of the pressure medium in the treatment region during the cooling phase and the determined rate of cooling during the cooling phase.

10. The method according to claim 5, wherein the obtaining of values indicative of the at least one temperature within the treatment region at the plurality of time instants comprises sensing at least one temperature within the treatment region at the plurality of time instants.

11. The method according to claim 5, wherein the at least one controllable pressure medium supplying device comprises at least one piston compressor, and the at least one operational parameter comprises a piston stroke length of the at least one piston compressor, and the method further comprises:

in response to a determination that the difference between the selected value for the rate of cooling of the pressure medium in the treatment region during the cooling phase and the determined rate of cooling during the cooling phase is within a predefined rate range, decreasing the piston stroke length of the at least one piston compressor by a selected fraction of a current piston stroke length from a first piston stroke length to a second piston stroke length, wherein the second piston stroke length is smaller than the first piston stroke length.

12. The method according to claim 11, wherein the at least one operational parameter comprises a compressor speed of the at least one piston compressor, the adjusting of the at least one operational parameter of the at least one controllable pressure medium supplying device based on the difference between the selected value for the rate of cooling of the pressure medium in the treatment region during the cooling phase and the determined rate of cooling during the cooling phase includes adjusting the compressor speed of the at least one piston compressor based on the difference between the selected value for the rate of cooling of the pressure medium in the treatment region during the cooling phase and the determined rate of cooling during the cooling phase; and the method further includes in response to a determination that the compressor speed of the at least one compressor is within a predefined compressor speed range subsequently to decreasing the piston stroke length of the at least one piston compressor from the first piston stroke length to the second piston stroke length, increasing the piston stroke length of the at least one piston compressor back towards or to the first piston stroke length.

13. A pressing arrangement, comprising:

a pressure vessel configured to hold pressure medium therein during use of the pressing arrangement, the pressure vessel including a treatment region therein, wherein the treatment region is configured to accommodate at least one article, and wherein the pressing arrangement is configured to subject the at least one article to a treatment cycle including a cooling phase, wherein the pressure vessel is configured to direct the pressure medium to enter and exit the treatment region;

at least one controllable pressure medium supplying device configured to transport the pressure medium during the cooling phase from another region in the pressing arrangement to the treatment region, wherein a temperature of the pressure medium in the other region is lower than a temperature of the pressure medium in the treatment region during at least part of the cooling phase such that the temperature of the pressure medium in the treatment region decreases based on the transport of the pressure medium during the cooling phase from the other region to the treatment region, wherein the at least one controllable pressure medium supplying device is controllable at least with respect to a pressure medium supplying rate, to control a rate of transport of the pressure medium from the other region to the treatment region, based on control of at least one operational parameter of the at least one controllable pressure medium supplying device;

at least one sensor configured to sense at least one temperature in the pressure vessel; and at least one control and processing circuitry communicatively coupled with the at least one sensor and communicatively coupled with the at least one controllable pressure medium supplying device, the at least one control and processing circuitry configured to control operation of the at least one controllable pressure medium supplying device, the at least one control and processing circuitry being configured to, during the cooling phase, obtain at least one value indicative of the at least one temperature in the pressure vessel that is sensed by the at least one sensor, and based on the at least one value indicative of the at least one temperature in the pressure vessel, adjust the at least one operational parameter of the at least one controllable pressure medium supplying device to adjust the pressure medium supplying rate of the at least one controllable pressure medium supplying device to adjust the rate of transport of the pressure medium from the other region to the treatment region, wherein the at least one controllable pressure medium supplying device comprises at least one compressor, the at least one compressor being configured to cause the pressure medium to be transported during the cooling phase from the other region to the treatment region based on operation of the at least one compressor, wherein the at least one operational parameter of the at least one controllable pressure medium supplying device is at least one operational parameter of the at least one compressor.

14. The pressing arrangement according to claim 13, wherein the at least one sensor is configured to sense at least one temperature in the other region of the pressure vessel, such that the obtained at least one value indicative of the at least one temperature in the pressure vessel includes at least one value indicative of the at least one temperature in the other region of the pressure vessel that is sensed by the at least one sensor.

15. The pressing arrangement according to claim 13, further comprising:

a furnace chamber within the pressure vessel, the furnace chamber at least partly enclosed by a heat insulated casing, the furnace chamber configured to direct the pressure medium to enter and exit the furnace chamber, wherein the treatment region is at least partially defined by an interior of the furnace chamber; and a plurality of pressure medium guiding passages in fluid communication with the furnace chamber and configured to form an outer cooling loop within the pressure vessel, wherein the at least one controllable pressure medium supplying device is configured to transport the pressure medium during the cooling phase from the outer cooling loop to the furnace chamber, wherein the other region in the pressing arrangement comprises at least a part of the outer cooling loop.

16. The pressing arrangement according to claim 15, wherein the pressure vessel comprises a pressure cylinder and an end closure, the heat insulated casing comprises a heat insulating portion and a housing at least partly enclosing the heat insulating portion, the outer cooling loop comprises a first part including at least one first pressure medium guiding passage formed between at least portions of the housing and the heat insulating portion, respectively, the at least one first pressure medium guiding passage configured to guide the pressure medium after having exited the furnace chamber towards the end closure, and a second part including at least one second pressure medium guiding passage configured to guide the pressure medium having exited the furnace chamber to flow in proximity to an inner surface of walls of the pressure cylinder;

wherein the at least one controllable pressure medium supplying device is configured to transport the pressure medium during the cooling phase from the second part of the outer cooling loop to the furnace chamber, wherein the other region in the pressing arrangement comprises at least a part of the second part of the outer cooling loop.

17. The pressing arrangement according to claim 13, wherein the at least one controllable pressure medium supplying device comprises at least one flow generator in fluid communication with the at least one compressor, the at least one flow generator within the pressure vessel and configured to receive the pressure medium from the other region at an upstream side of the at least one flow generator, and output a flow of the pressure medium at a downstream side of the at least one flow generator.

18. The pressing arrangement according to claim 17, wherein the at least one flow generator is further configured to receive the pressure medium from the at least one compressor at the upstream side of the at least one flow generator, and mix the pressure medium received from the at least one compressor and the pressure medium received from the other region to obtain a pressure medium mixture, wherein the flow of the pressure medium that is output at the downstream side of the at least one flow generator includes the pressure medium mixture.

19. A control and processing circuitry configured to be communicatively coupled with a pressing arrangement, the pressing arrangement including a pressure vessel configured to hold pressure medium therein during use of the pressing arrangement, the pressure vessel including a treatment region therein, wherein the treatment region is configured to accommodate at least one article, wherein the pressing arrangement is configured to subject the at least one article to a treatment cycle including a cooling phase, wherein the pressure vessel is configured to direct the pressure medium to enter and exit the treatment region, the pressing arrangement further including at least one controllable pressure medium supplying device configured to transport the pressure medium during the cooling phase from another region in the pressing arrangement to the treatment region, wherein a temperature of the pressure medium in the other region is lower than a temperature of the pressure medium in the treatment region during at least part of the cooling phase such that the temperature of the pressure medium in the treatment region decreases based on the transport of the pressure medium during the cooling phase from the other region to the treatment region, wherein the at least one controllable pressure medium supplying device is controllable at least with respect to a pressure medium supplying rate, to control a rate of transport of the pressure medium from the other region to the treatment region, based on control of at least one operational parameter of the at least one controllable pressure medium supplying device, the pressing arrangement further including at least one sensor configured to sense at least one temperature in the pressure vessel, the control and processing circuitry configured to be communicatively coupled with both the at least one sensor of the pressing arrangement and with the at least one controllable pressure medium supplying device of the pressing arrangement, the control and processing circuitry configured to control operation of the at least one controllable pressure medium supplying device, the control and processing circuitry configured to:

obtain at least one value indicative of at least one temperature in the pressure vessel of the pressing arrangement that is sensed by the at least one sensor; and based on the at least one value indicative of the at least one temperature in the pressure vessel, adjust the at least one operational parameter of the at least one controllable pressure medium supplying device to adjust the pressure medium supplying rate of the at least one controllable pressure medium supplying device to adjust a rate of transport of pressure medium from the other region of the pressure vessel to the treatment region of the pressure vessel, wherein the at least one controllable pressure medium supplying device comprises at least one compressor, the at least one compressor being configured to cause the pressure medium to be transported during the cooling phase from the other region to the treatment region based on operation of the at least one compressor, wherein the at least one operational parameter of the at least one controllable pressure medium supplying device is at least one operational parameter of the at least one compressor.

20. A non-transitory computer-readable storage medium storing a computer program product that, when executed in a control and processing circuitry, causes the control and processing circuitry to perform the method according to claim 1.

* * * * *